US012675057B2

(12) United States Patent
Kamae et al.

(10) Patent No.: US 12,675,057 B2
(45) Date of Patent: Jul. 7, 2026

(54) TONER

(71) Applicant: CANON KABUSHIKI KAISHA, Tokyo (JP)

(72) Inventors: Kentaro Kamae, Kanagawa (JP); Tomoyo Miyakai, Tokyo (JP); Maki Imura, Chiba (JP); Yuu Nishimura, Chiba (JP); Shin Kitamura, Ibaraki (JP); Takaho Shibata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1016 days.

(21) Appl. No.: 17/661,167

(22) Filed: Apr. 28, 2022

(65) Prior Publication Data

US 2022/0373911 A1 Nov. 24, 2022

(30) Foreign Application Priority Data

May 12, 2021 (JP) ................................ 2021-081004

(51) Int. Cl.
*G03G 9/087* (2006.01)

(52) U.S. Cl.
CPC ................................ *G03G 9/08755* (2013.01)

(58) Field of Classification Search
CPC ................................................ G03G 9/08755
See application file for complete search history.

(56) References Cited

U.S. PATENT DOCUMENTS

| | | | |
|---|---|---|---|
| 7,833,687 | B2 | 11/2010 | Kato |
| 8,084,174 | B2 | 12/2011 | Hasegawa |
| 8,323,726 | B2 | 12/2012 | Naka |
| 8,697,327 | B2 | 4/2014 | Shibata |
| 8,921,023 | B2 | 12/2014 | Baba |
| 8,927,188 | B2 | 1/2015 | Naka |
| 8,974,994 | B2 | 3/2015 | Kamae |
| 8,986,914 | B2 | 3/2015 | Fujikawa |
| 9,057,970 | B2 | 6/2015 | Ida |
| 9,058,924 | B2 | 6/2015 | Komatsu |
| 9,063,443 | B2 | 6/2015 | Ishigami |
| 9,348,247 | B2 | 5/2016 | Ida |
| 9,540,483 | B2 | 1/2017 | Ida |
| 9,665,023 | B2 | 5/2017 | Kamae |
| 9,696,644 | B2 | 7/2017 | Ida |
| 9,897,934 | B2 | 2/2018 | Tamura |
| 9,915,885 | B2 | 3/2018 | Katsumata |
| 9,969,834 | B2 | 5/2018 | Ohtsu |
| 10,012,918 | B2 | 7/2018 | Ishigami |
| 10,012,920 | B2 | 7/2018 | Shibata |
| 10,012,921 | B2 | 7/2018 | Kamae |
| 10,078,281 | B2 | 9/2018 | Ida |
| 10,088,765 | B2 | 10/2018 | Miyakai |
| 10,133,201 | B2 | 11/2018 | Kamae |
| 10,203,619 | B2 | 2/2019 | Yamashita |
| 10,216,108 | B2 | 2/2019 | Iwasaki |
| 10,228,629 | B2 | 3/2019 | Tamura |
| 10,234,777 | B2 | 3/2019 | Ohtsu |
| 10,353,312 | B2 | 7/2019 | Kamae |
| 10,423,090 | B2 | 9/2019 | Ohtsu |
| 10,451,990 | B2 | 10/2019 | Kamae |
| 10,514,624 | B2 | 12/2019 | Tamura |
| 10,642,178 | B2 | 5/2020 | Yamashita |
| 10,656,545 | B2 | 5/2020 | Kamae |
| 10,775,710 | B1 | 9/2020 | Kamae |
| 10,859,931 | B2 | 12/2020 | Hashimoto |
| 10,877,386 | B2 | 12/2020 | Murayama |
| 10,969,705 | B2 | 4/2021 | Shirayama |
| 11,112,711 | B2 | 9/2021 | Ochi |
| 11,131,938 | B2 | 9/2021 | Murayama |
| 11,181,848 | B2 | 11/2021 | Ochi |
| 11,385,558 | B2 | 7/2022 | Chimoto |
| 2010/0310980 | A1* | 12/2010 | Sugimoto .......... G03G 9/08755 430/108.4 |

(Continued)

FOREIGN PATENT DOCUMENTS

| | | | |
|---|---|---|---|
| CN | 107402499 | A | 11/2017 |
| JP | 2005275146 | A * | 10/2005 |

(Continued)

OTHER PUBLICATIONS

JP-2009063987-A Translation (Year: 2025).*

(Continued)

*Primary Examiner* — Mark F. Huff
*Assistant Examiner* — Charles Collins Sullivan, IV
(74) *Attorney, Agent, or Firm* — VENABLE LLP

(57) ABSTRACT

A toner, comprising a toner particle comprising a binder resin, wherein the binder resin comprises an amorphous polyester and a crystalline polyester; (i) a weight-average molecular weight of a soluble matter of the crystalline polyester in o-dichlorobenzene at 100° C. is 1500 to 4900; (ii) the crystalline polyester comprises a modified crystalline polyester having at least one terminal-modified structure selected from among a structure in which a hydroxy group at a main chain terminal of the crystalline polyester is terminal-modified with a C16 to C31 aliphatic monocarboxylic acid, and a structure in which a carboxy group at a main chain terminal of the crystalline polyester is terminal-modified with a C15 to C30 aliphatic monoalcohol; and (iii) a content ratio of the terminal-modified structure in the crystalline polyester is 80.0 mol % or higher.

9 Claims, No Drawings

(56) References Cited

U.S. PATENT DOCUMENTS

| | | | | |
|---|---|---|---|---|
| 2011/0294064 | A1* | 12/2011 | Miyaake | G03G 9/08755 430/124.1 |
| 2013/0108955 | A1 | 5/2013 | Shibata | |
| 2013/0244159 | A1 | 9/2013 | Ishigami | |
| 2014/0134535 | A1 | 5/2014 | Baba | |
| 2015/0099227 | A1 | 4/2015 | Ida | |
| 2017/0242355 | A1 | 8/2017 | Ishigami et al. | |
| 2017/0269493 | A1 | 9/2017 | Ohtsu et al. | |
| 2017/0336727 | A1 | 11/2017 | Ikejiri et al. | |
| 2018/0275540 | A1 | 9/2018 | Matsuo | |
| 2020/0409284 | A1 | 12/2020 | Matsubara | |
| 2020/0409285 | A1 | 12/2020 | Tokunaga | |
| 2021/0055668 | A1 | 2/2021 | Tamura | |
| 2021/0063903 | A1 | 3/2021 | Shibata | |
| 2021/0080848 | A1 | 3/2021 | Tsuchida | |
| 2021/0141315 | A1 | 5/2021 | Kamae | |
| 2021/0181647 | A1 | 6/2021 | Hashimoto | |
| 2021/0181649 | A1 | 6/2021 | Kanno | |
| 2021/0181650 | A1 | 6/2021 | Hama | |
| 2021/0181651 | A1 | 6/2021 | Kanno | |
| 2021/0223710 | A1 | 7/2021 | Takahashi | |
| 2021/0278774 | A1 | 9/2021 | Hashimoto | |
| 2021/0278775 | A1 | 9/2021 | Kamae | |
| 2021/0286282 | A1 | 9/2021 | Kobori | |
| 2021/0302853 | A1 | 9/2021 | Murata | |
| 2021/0302854 | A1 | 9/2021 | Kitamura | |
| 2021/0389688 | A1 | 12/2021 | Shibata | |
| 2021/0397106 | A1 | 12/2021 | Kobori | |
| 2022/0050398 | A1 | 2/2022 | Ooyama | |
| 2022/0299903 | A1 | 9/2022 | Izumiya et al. | |

FOREIGN PATENT DOCUMENTS

| | | | | |
|---|---|---|---|---|
| JP | 2009063987 | A | * | 3/2009 |
| JP | 2013-257415 | A | | 12/2013 |
| JP | 2014129444 | A | * | 7/2014 |
| JP | 2015-64549 | A | | 4/2015 |
| JP | 2015-114482 | A | | 6/2015 |
| JP | 2015-121607 | A | | 7/2015 |
| JP | 2016-197207 | A | | 11/2016 |
| JP | 2016-212399 | A | | 12/2016 |
| JP | 2017-167343 | A | | 9/2017 |
| JP | 2017-211648 | A | | 11/2017 |
| JP | 2018-156074 | A | | 10/2018 |
| JP | 2019-159315 | A | | 9/2019 |
| JP | 2019-215402 | A | | 12/2019 |
| JP | 2021-47403 | A | | 3/2021 |
| JP | 2021-56476 | A | | 4/2021 |

OTHER PUBLICATIONS

JP-2014129444-A Translation (Year: 2025).*
JP-2005275146-A Translation (Year: 2025).*
U.S. Appl. No. 17/661,168, filed Apr. 28, 2022, Maki Imura.
Robert F. Fedors "A Method for Estimating Both the Solubility Parameters and Molar Volumes of Liquids", Polymer Engineering and Science, vol. 14, No. 2 (1974) 147-54.

* cited by examiner

TONER

BACKGROUND OF THE INVENTION

Field of the Invention

The present disclosure relates to a toner that is used for instance in electrophotographic systems, electrostatic recording systems and electrostatic printing systems.

Description of the Related Art

The growing spread of electrophotographic full-color copiers in recent years has been accompanied by a demand for improvements in terms of additional performance, naturally in terms of higher speeds and better image quality, but also in terms of energy saving, shorter recovery times from sleep mode, and compatibility with diverse media.

Specifically, toners boasting excellent low-temperature fixing performance and that enable fixing at lower temperatures are demanded as toners that afford energy savings, for the purpose of reducing power consumption in a fixing process. From the viewpoint of shortening recovery times from sleep mode, toners are also demanded that exhibit superior charge retention, with little variation in charge quantity through sleep modes, over long periods of time.

Moreover, heavy coated paper, being herein one kind of various media, contains large amounts of inorganic fine particles of calcium carbonate or the like, for the purpose of enhancing whiteness; accordingly, the coefficient of friction derived from rubbing between paper sheets is thus large, and the toner in the fixed image peels readily off the paper. Therefore, toners having excellent abrasion resistance are demanded such that the surface of a fixed image becomes coated with a wax and it is possible that the coefficient of friction is lowered, and exudation of the wax is promoted, in order to suppress toner peeling derived from rubbing between paper sheets.

Such being the case, Japanese Patent Application Publication No. 2018-156074 proposes a toner that utilizes a crystalline polyvinyl resin, as a toner having excellent low-temperature fixing performance, charge retention and abrasion resistance.

Further, Japanese Patent Application Publication No. 2016-197207 proposes a toner boasting excellent abrasion resistance, in the form of a toner having an alkenylsuccinic acid as a carboxylic acid component of a polyester.

SUMMARY OF THE INVENTION

The toner disclosed in Japanese Patent Application Publication No. 2018-156074 utilizes a highly hydrophobic crystalline polyvinyl resin having a sharp melt property, thanks to which the toner can bring out excellent low-temperature fixing performance and charge retention. Crystalline polyvinyl resins have high affinity to waxes, and as a result exudation of the wax is suppressed, and a wax layer does not form readily on the surface of the fixed image. It has been found that, as a result, the coefficient of friction derived from rubbing between paper sheets does not decrease, and the toner on the fixed image may peel off the paper.

In the toner disclosed in Japanese Patent Application Publication No. 2016-197207, and the wax is likelier to be held on the fixed image than to migrate towards a fixing roller, at the time of fixing, due to the high affinity of alkenylsuccinic acids towards waxes; as a result, a certain abrasion resistance effect is achieved in paper types such as ordinary paper. It was however found that exudation of wax on the fixed image surface was suppressed on account of the high affinity of the binder resin to the wax, and abrasion resistance was thus poor in some instances, in heavy coated paper.

As expounded above it is difficult to provide a toner that satisfies all of low-temperature fixing performance, charge retention and abrasion resistance. There is accordingly an urgent need to develop toners that exhibit excellent low-temperature fixing performance and charge retention, and superior abrasion resistance also in fixed images on heavy coated paper or the like. The present disclosure provides a toner that exhibits excellent low-temperature fixing performance and charge retention, and exhibits excellent abrasion resistance also in fixed images on heavy coated paper or the like.

The present disclosure relates to a toner, comprising a toner particle comprising a binder resin, wherein the binder resin comprises an amorphous polyester and a crystalline polyester;

(i) a weight-average molecular weight of a soluble matter of the crystalline polyester in o-dichlorobenzene at 100° C. is 1500 to 4900;

(ii) the crystalline polyester comprises a modified crystalline polyester having at least one terminal-modified structure selected from among a structure in which a hydroxy group at a main chain terminal of the crystalline polyester is terminal-modified with a C16 to C31 aliphatic monocarboxylic acid, and a structure in which a carboxy group at a main chain terminal of the crystalline polyester is terminal-modified with a C15 to C30 aliphatic monoalcohol; and (iii) a content ratio of the terminal-modified structure in the crystalline polyester is 80.0 mol % or higher.

The present disclosure can provide a toner that exhibits excellent low-temperature fixing performance and charge retention, and exhibits excellent abrasion resistance also in fixed images on heavy coated paper or the like. Further features of the present invention will become apparent from the following description of exemplary embodiments.

DESCRIPTION OF THE EMBODIMENTS

In the present disclosure the notations "from XX to YY" and "XX to YY" representing a numerical value range signify, unless otherwise specified, a numerical value range that includes the lower limit and the upper limit of the range, as endpoints. In a case where numerical value ranges are described in stages, the upper limits and the lower limits of the respective numerical value ranges can be combined arbitrarily. Further, the term monomer unit refers to a form resulting from reaction of a monomer substance in a polymer. The term crystalline polyester denotes a resin exhibiting a clear endothermic peak in a differential scanning calorimetric (DSC) measurement.

The inventors studied assiduously toners that are excellent in low-temperature fixing performance and charge retention, and also excellent in abrasion resistance. As a result, the inventors found that the crystallinity of a material is important in terms of bringing out a high level of abrasion resistance in an image. The inventors focused therefore on a crystalline polyester that has crystallinity, while exhibiting affinity with paper, as a crystalline material that does not hinder fixing. Examples of means for increasing the degree of crystallinity of a crystalline material include for instance reducing the molecular weight of the material, in order to increase the diffusion coefficient of the material and facilitate the formation of a folded structure.

However, simply reducing herein the molecular weight of a crystalline polyester results in a higher proportion of terminal hydroxy groups and carboxy groups relative to hydrocarbon moieties included in for instance in a main chain, which translates into an increased polarity of the crystalline polyester. In a case where an amorphous polyester is further used as the binder resin, the crystalline polyester and the amorphous polyester are compatible with each other in a fixing step. As a result, it was found that an image having a low coefficient of friction cannot be provided since crystallization of the crystalline polyester in the toner image does not proceed.

Therefore, the inventors pushed forward their studies and envisaged capping of terminal hydroxy groups and carboxy groups, to the utmost limit, while lowering the molecular weight of the crystalline polyester, to reduce thus the proportion of these groups. The inventors found that lowering thus the polarity of the crystalline polyester allows the crystalline polyester to crystallize instantly after the fixing step, and allows providing an image having a low coefficient of friction. Specifically, the inventors recognized the importance of causing a monomer having a C15 to C30 aliphatic hydrocarbon group to react with the crystalline polyester. Such monomers are highly reactive with terminal hydroxy groups and carboxy groups, and can serve as a starting point of a folded structure of the main chain of the crystalline polyester, in the manner of a crystal nucleating agent; moreover, such monomers allow lowering the polarity of the crystalline polyester itself.

The toner particle comprises a binder resin. The binder resin contains an amorphous polyester and a crystalline polyester. Herein, (i) the weight-average molecular weight of the soluble matter of the crystalline polyester in o-dichlorobenzene at 100° C. is from 1500 to 4900. When the weight-average molecular weight of the soluble matter of the crystalline polyester in o-dichlorobenzene at 100° C. lies within the above range, a diffusion coefficient of the crystalline polyester can be increased, the folded structure can be formed readily, the degree of crystallinity can be increased; and an image having a low coefficient of friction can be formed, as a result of which a superior abrasion resistance effect is achieved. Since the degree of crystallinity is thus increased, molecular motion is suppressed, and charge paths form less readily; an excellent charge retention effect can be achieved as a result.

The weight-average molecular weight of the soluble matter of the crystalline polyester in o-dichlorobenzene at 100° C. is preferably from 1800 to 2500. The weight-average molecular weight of the crystalline polyester can be controlled to lie within the above range through formation of a below-described structure in which a hydroxy group at a main chain terminal of the crystalline polyester is terminal-modified with a C16 to C31 aliphatic monocarboxylic acid, and a structure in which a carboxy group at a main chain terminal of the crystalline polyester is terminal-modified with a C15 to C30 aliphatic monoalcohol.

Herein, (ii) the crystalline polyester contains a modified crystalline polyester that has at least one terminal-modified structure selected from among a structure in which a hydroxy group at a main chain terminal of the crystalline polyester is terminal-modified with a C16 to C31 (preferably C18 to C26, more preferably C20 to C24) aliphatic monocarboxylic acid, and a structure in which a carboxy group at a main chain terminal of the crystalline polyester is terminal-modified with a C15 to C30 (preferably C18 to C26, more preferably C20 to C24) aliphatic monoalcohol. Also, (iii) the content ratio of the terminal-modified structure in the crystalline polyester is 80.0 mol % or higher.

When the hydroxy group and the carboxy group at main chain terminals are modified, compatibility with the amorphous polyester which is a binder resin can be suppressed by virtue of the fact that high-polarity functional groups are modified in that case. As a result, the degree of crystallinity of the crystalline polyester can be increased, and an image having a low coefficient of friction can be formed, whereby an excellent abrasion resistance effect is achieved. Since the degree of crystallinity is thus increased, molecular motion is suppressed, and charge paths form less readily; an excellent charge retention effect can be achieved as a result.

When the number of carbon atoms of the terminal-modified aliphatic monocarboxylic acid or aliphatic monoalcohol lies in the above range, the foregoing can constitute a starting point of the folded structure of the main chain of the crystalline polyester, in the manner of a crystal nucleating agent. Further, the polarity of the crystalline polyester itself can be lowered, and compatibility with the amorphous polyester can be suppressed. As a result, the degree of crystallinity of the crystalline polyester can be decreased, and an image having a low coefficient of friction can be formed, whereby an excellent abrasion resistance effect is achieved. Since the degree of crystallinity is thus increased, molecular motion is suppressed, and charge paths form less readily; an excellent charge retention effect can be achieved as a result.

An effect of raising the above degree of crystallinity, and also an effect of lowering the polarity of the crystalline polyester and suppressing compatibility with amorphous polyester are brought out by virtue of the fact that the content ratio of the terminal-modified structure is 80.0 mol % or higher. Effects of excellent abrasion resistance and charge retention can be achieved as a result. The content ratio of the terminal-modified structure is preferably 90.0 mol % or higher, more preferably 95.0 mol % or higher, and yet more preferably 98.0 mol % or higher. The upper limit is not particularly restricted, but is preferably 100.0 mol % or lower, and more preferably 99.0 mol % or lower. The content ratio of the terminal-modified structure can be controlled on the basis of the addition amount of the terminal-modified aliphatic monocarboxylic acid or aliphatic monoalcohol.

The crystalline polyester preferably has a structure in which a hydroxy group at a main chain terminal is terminal-modified with a C16 to C31 aliphatic monocarboxylic acid. The structure that is terminal-modified with the above aliphatic monocarboxylic acid is represented by Formula (I) below. The structure in which a carboxy group at a main chain terminal is terminal-modified with a C15 to C30 aliphatic monoalcohol is represented by Formula (II) below.

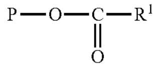

(I)

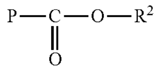

(II)

In the formula, P represents the main chain structure of the crystalline polyester; $R^1$ is a C15 to C30 (preferably C17 to C25, more preferably C19 to C23) (preferably linear) alkyl group; $R^2$ is a C15 to C30 (preferably C18 to C26, more preferably C20 to C24) (preferably linear) alkyl group; such that in (I), —$COR^1$ is a monomer unit of an aliphatic monocarboxylic acid, and in (II), —$OR^2$ is a monomer unit of an aliphatic monoalcohol.

The total content ratio, in the crystalline polyester, of monomer units of the aliphatic monocarboxylic acid and monomer units of the aliphatic monoalcohol, and included in the terminal-modified structure, is preferably 30.0 mass % or higher, more preferably 33.0 mass % or higher. The upper limit is not particularly restricted, but is preferably 70.0 mass % or lower, more preferably 65.0 mass % or lower, and yet more preferably 40.0 mass % or lower.

An instance where the total content ratio of the monomer units of the aliphatic monocarboxylic acid and the monomer units of the aliphatic monoalcohol contained in the terminal-modified structure lies within the above range signifies that hydroxy groups and carboxy groups at the main chain terminals are amply modified. Therefore, compatibility of the crystalline polyester with the amorphous polyester can be further suppressed. Also, the degree of crystallinity of the crystalline polyester can be increased, and an image having a lower coefficient of friction can be formed, thanks to which more pronounced abrasion resistance effect is achieved. Since the degree of crystallinity is thus increased, molecular motion is suppressed and charge paths form less readily, and thus a yet better charge retention effect can be achieved as a result.

The total of the acid value and the hydroxyl value of the crystalline polyester is preferably from 0.1 mgKOH/g to 5.0 mgKOH/g. An instance where the total of the acid value and the hydroxyl value of the crystalline polyester lies in the above range signifies that hydroxy groups and carboxy groups at the main chain terminals are amply modified, and thus compatibility with the amorphous polyester can be suppressed. Therefore, the degree of crystallinity of the crystalline polyester can be increased, and an image having a lower coefficient of friction can be formed, thanks to which a more pronounced abrasion resistance effect can be achieved. Since the degree of crystallinity is thus increased, molecular motion is suppressed and charge paths form less readily, and thus a yet better charge retention effect can be achieved as a result.

The total of the acid value and the hydroxyl value of the crystalline polyester is more preferably from 0.1 mgKOH/g to 3.0 mgKOH/g, and yet more preferably from 0.2 mgKOH/g to 2.0 mgKOH/g. The total of the acid value and hydroxyl value of the crystalline polyester can be controlled on the basis of the type and the addition amount of monomers.

Herein $SP_C$, which denotes the SP value of the crystalline polyester, is preferably from 8.8 $(cal/cm^3)^{0.5}$ to 9.4 $(cal/cm^3)^{0.5}$. An instance where $SP_C$ lies in the above range signifies that hydroxy groups and carboxy groups at the main chain terminals are amply modified, and compatibility with the amorphous polyester can be suppressed. Therefore, the degree of crystallinity of the crystalline polyester can be increased, and an image having a lower coefficient of friction can be formed, thanks to which a more pronounced abrasion resistance effect can be achieved. Since the degree of crystallinity is thus increased, molecular motion is suppressed and charge paths form less readily, and thus a yet better charge retention effect can be achieved as a result.

The value of $SP_C$ is more preferably from 8.8 $(cal/cm^3)^{0.5}$ to 9.2 $(cal/cm^3)^{0.5}$, and yet more preferably from 8.9 $(cal/cm^3)^{0.5}$ to 9.1 $(cal/cm^3)^{0.5}$. Herein $SP_C$ can be controlled on the basis of the type and addition amount of monomers.

Further, $SP_A$, which denotes the SP value of the amorphous polyester, is preferably from 10.5 $(cal/cm^3)^{0.5}$ to 11.5 $(cal/cm^3)^{0.5}$. An instance where $SP_A$ lies in the above range signifies that the amorphous polyester and the crystalline polyester have a certain affinity towards each other; as a result of which a crystalline polyester that affords a low coefficient of friction is supported on the amorphous polyester, and a more pronounced abrasion resistance effect is achieved. At the time of fixing, moreover, the melted crystalline polyester is compatible with the amorphous polyester, and as a result a yet better low-temperature fixing performance effect can be achieved.

The value of $SP_A$ is more preferably from 10.6 $(cal/cm^3)^{0.5}$ to 11.1 $(cal/cm^3)^{0.5}$, and yet more preferably from 10.7 $(cal/cm^3)^{0.5}$ to 11.0 $(cal/cm^3)^{0.5}$. Herein $SP_A$ can be controlled on the basis of the type and addition amount of monomers.

Preferably, the $SP_A$ and $SP_C$ of the crystalline polyester and the amorphous polyester satisfy Expression (1) below.

$$1.5 \leq SP_A - SP_C \leq 2.1 \quad (1)$$

An instance where $SP_A$ and $SP_C$ lie within the above range signifies that the amorphous polyester and the crystalline polyester have a certain affinity towards each other; and accordingly the amorphous polyester readily supports a crystalline polyester that affords a low coefficient of friction, and a more pronounced abrasion resistance effect is achieved. At the time of fixing, moreover, the melted crystalline polyester is compatible with the amorphous polyester, and as a result a yet better low-temperature fixing performance effect can be achieved.

More preferably, $SP_A - SP_C$ satisfies Expression (4) below, and yet more preferably Expression (5) below. Herein $SP_A - SP_C$ can be controlled on the basis of the type and addition amount of monomers.

$$1.6 \leq SP_A - SP_C \leq 2.0 \quad (4)$$

$$1.7 \leq SP_A - SP_C \leq 1.9 \quad (5)$$

An endothermic quantity ΔH of the toner, derived from the crystalline polyester and measured by differential scanning calorimetric measurement DSC, is preferably from 5.0 J/g to 15.0 J/g. An instance where ΔH lies in the above range signifies that the crystal content of the toner is sufficient as to lower the coefficient of friction, thanks to which a more pronounced abrasion resistance effect is achieved.

The endothermic quantity ΔH derived from the crystalline polyester is preferably from 7.0 J/g to 15.0 J/g, and more preferably from 9.0 J/g to 12.0 J/g. Herein ΔH derived from the crystalline polyester can be controlled on the basis of $SP_A - SP_C$ and the addition amount of the crystalline polyester.

The main chain of the crystalline polyester is preferably a condensation polymer of an aliphatic dicarboxylic acid and an aliphatic diol. The difference in number of carbon between the aliphatic dicarboxylic acid and the aliphatic diol is 4 or less. In a case where the difference in the number of carbon is 4 or less, the folded structure of the main chain of the crystalline polyester forms readily, the degree of crystallinity can be increased, and an image having a low coefficient of friction can be formed, whereby a more pronounced abrasion resistance effect is achieved. Since the degree of crystallinity is thus increased, molecular motion is suppressed and charge paths form less readily, and thus a yet better charge retention effect can be achieved as a result. The difference in the number of carbon atoms is more preferably 2 or less. The lower limit is not particularly restricted, but is preferably 0 or larger. The difference in the number of carbon atoms is yet more preferably 0.

The toner particle preferably contains a hydrocarbon wax. Preferably, $SP_C$ and $SP_W$, the latter being the SP value of the hydrocarbon wax, satisfy Expression (2) below.

$$0.7 \leq SP_C - SP_W \leq 1.2 \quad (2)$$

In a case where $SP_W$ and $SP_C$ lie in the above range, the hydrocarbon wax yields crystal nuclei that constitute starting points of the folded structure of the main chain of the crystalline polyester, and the degree of crystallinity can be thus increased further, since the hydrocarbon wax and the crystalline polyester exhibit a certain affinity towards each other. An image having a lower coefficient of friction can be formed as a result, thanks to which a more pronounced abrasion resistance effect can be achieved. Since the degree of crystallinity is thus increased, molecular motion is suppressed and charge paths form less readily, and thus a yet better charge retention effect can be achieved as a result.

Further, $SP_C - SP_W$ more preferably satisfies Expression (6) below, and yet more preferably Expression (7) below. Herein $SP_C - SP_W$ can be controlled on the basis of the type and addition amount of monomers.

$$0.8 \leq SP_C - SP_W \leq 1.2 \quad (6)$$

$$0.9 \leq SP_C - SP_W \leq 1.1 \quad (7)$$

Preferably, Expression (3) below is satisfied, where $T_W$ is the melting point of the hydrocarbon wax and $T_C$ is the melting point of the crystalline polyester.

$$0.0 \leq |T_C - T_W| \leq 25.0 \quad (3)$$

In a case where $T_W$ and $T_C$ lie in the above range, the hydrocarbon wax yields crystal nuclei that constitute starting points of the folded structure of the main chain of the crystalline polyester. The degree of crystallinity can be thus increased further, since the hydrocarbon wax and the crystalline polyester exhibit a certain affinity towards each other. An image having a lower coefficient of friction can be formed as a result, thanks to which a more pronounced abrasion resistance effect can be achieved. Since the degree of crystallinity is thus increased, molecular motion is suppressed and charge paths form less readily, and thus a yet better charge retention effect can be achieved as a result.

More preferably, $|T_C - T_W|$ satisfies Expression (8) below, and yet more preferably Expression (9) below. Herein $|T_C - T_W|$ can be controlled on the basis of the type and the molecular weight of the monomers.

$$1.0 \leq |T_C - T_W| \leq 10.0 \quad (8)$$

$$2.0 \leq |T_C - T_W| \leq 6.0 \quad (9)$$

Amorphous Polyester

The amorphous polyester is preferably a condensation polymer of a polyhydric alcohol (dihydric, trihydric or higher alcohol) and a polyvalent carboxylic acid (divalent, trivalent or higher carboxylic acid), an acid anhydride thereof, or a lower alkyl ester thereof.

The following polyhydric alcohol monomers can be used as a polyhydric alcohol monomer for the amorphous polyester. Examples of the dihydric alcohol component include ethylene glycol, propylene glycol, 1,3-butanediol, 1,4-butanediol, 2,3-butanediol, diethylene glycol, triethylene glycol, 1,5-pentanediol, 6-hexanediol, neopentyl glycol, 2-ethyl-1,3-hexanediol, hydrogenated bisphenol A, bisphenol represented by formula (A) and derivatives thereof.

(A)

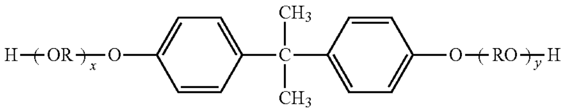

(in the formula, R is ethylene or propylene, x and y are each an integer of 0 or more, and the average value of x+y is from 0 to 10).

Diols represented by formula (B) can be mentioned.

(B)

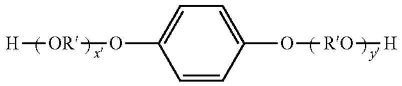

(In the formula, R' is $-CH_2CH_2-$, 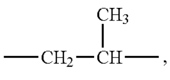, or 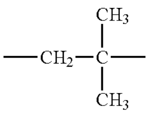, and x' and y' are each an integer equal to or greater than 0, such that the average value of x'+y' is from 0 to 10.)

Examples of the trivalent or higher alcohol component include sorbitol, 1,2,3,6-hexanetetrol, 1,4-sorbitan, pentaerythritol, dipentaerythritol, tripentaerythritol, and 1,2,4-butanetriol. 1,2,5-pentanetriol, glycerol, 2-methylpropanetriol, 2-methyl-1,2,4-butanetriol, trimethylolethane, trimethylolpropane, and 1,3,5-trihydroxymethylbenzene. Among these, glycerol, trimethylolpropane and pentaerythritol are preferably used. These dihydric alcohols and trihydric or higher alcohols may be used singly or in combination of a plurality thereof.

The following polyvalent carboxylic acid monomers can be used as a polyvalent carboxylic acid monomer used for the polyester resin. Examples of the divalent carboxylic acid component include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isododecenylsuccinic acid, n-dodecylsuccinic acid, isododecylsuccinic acid, n-octenylsuccinic acid, n-octylsuccinic acid, isooctenylsuccinic acid, isooctylsuccinic acid, anhydrides of these acids, lower alkyl esters thereof and the like. Among these, maleic acid, fumaric acid, terephthalic acid and n-dodecenyl succinic acid are preferably used.

Examples of the trivalent or higher carboxylic acid, acid anhydrides thereof and lower alkyl esters thereof include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl) methane, 1,2,7,8-octanetetracarboxylic acid, pyromellitic acid, Empol trimer acid, acid anhydrides thereof and lower alkyl esters thereof. Among these, 1,2,4-benzenetricarboxylic acid, that is, trimellitic acid or a derivative thereof is particularly preferably used because it is inexpensive and the reaction control is easy. These divalent carboxylic acids and the like and trivalent or higher carboxylic acids can be used alone or in combination of a plurality thereof.

A method for producing the polyester resin is not particularly limited, and known methods can be used. For example, the above-mentioned alcohol monomer and carboxylic acid monomer are simultaneously charged and polymerized through an esterification reaction or a transesterification reaction and a condensation reaction to produce a polyester resin. The polymerization temperature is not particularly limited, but is preferably in the range of from 180° C. to 290° C. In the polymerization of the polyester resin, for example, a polymerization catalyst such as a titanium-based catalyst, a tin-based catalyst, zinc acetate, antimony trioxide, germanium dioxide or the like can be used. In particular, the polyester resin is more preferably a polyester resin polymerized using a tin-based catalyst.

The amorphous polyester preferably contains monomer units represented by Formula (F) below and monomer units represented by Formula (G) below, and more preferably contains monomer units represented by Formula (E) below, monomer units represented by Formula (F) below and monomer units represented by Formula (G) below. These monomer units facilitate achieving excellent low-temperature fixing performance, charge retention and abrasion resistance. The term monomer unit refers to a form resulting from reaction of a monomer substance in a polymer. The content ratio of the monomer units represented by Formula (E) in the amorphous polyester is preferably from 20 mass % to 60 mass %, more preferably from 30 mass % to 50 mass %. The content ratio of the monomer units represented by Formula (F) in the amorphous polyester is preferably from 20 mass % to 65 mass %, more preferably from 30 mass % to 50 mass %. The content ratio of the monomer units represented by Formula (G) in the amorphous polyester is preferably from 7 mass % to 30 mass %, more preferably from 10 mass % to 30 mass %, and yet more preferably from 15 mass % to 25 mass %.

In the formula, $R^3$ represents a benzene ring, preferably bonded at the para position; $R^4$ each represents an ethylene group or a propylene group; x and y are each integers equal to or greater than 1, such that the average value of x+y is from 2 to 10; and $R^5$ represents an ethylene group or a propylene group, and is preferably an ethylene group.

(E)

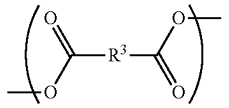

(F)

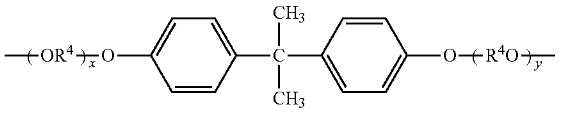

(G)

$$-(O-R^5-O)-$$

The amorphous polyester may be a hybrid resin containing other resin components, so long as the main component of the hybrid resin is an amorphous polyester. The term main component signifies that the content ratio thereof is from 50 mass % to 100 mass %, preferably from 80 mass % to 100 mass %, and more preferably from 90 mass % to 100 mass %. Examples of the hybrid resin include hybrid resins of polyester resins and vinyl type resins. Methods for obtaining a reaction product, such as a hybrid resin, of a vinyl type resin and a polyester resin, include for instance the following method. Where a monomer component is present that can react with both a vinyl type resin and a polyester resin, a method is preferred that involves conducting a polymerization reaction of either one or both of the resins.

For instance examples of monomers capable of reacting with vinyl type copolymers, from among monomers that make up a polyester resin component, include unsaturated dicarboxylic acids and anhydrides thereof, such as phthalic acid, maleic acid, citraconic acid and itaconic acid. Examples of monomers capable of reacting with a polyester resin component, from among monomers that make up a vinyl type copolymer component, include monomers having a carboxyl group or hydroxy group, and esters of acrylic acid and methacrylic acid.

Various resin compounds that are well known as binder resins can be used concomitantly with the binder resin, in addition to the crystalline polyester and the amorphous polyester, so long as the above effect is not impaired. Examples of such resin compounds include phenolic resins, phenolic resins modified with a natural resin, maleic resins modified with a natural resin, acrylic resin, methacrylic resins, polyvinyl acetate resins, silicone resins, polyester resins, polyurethanes, polyamide resins, furan resins, epoxy resins, xylene resins, polyvinyl butyral, terpene resins, coumarone-indene resins and petroleum type resins.

The content ratio of the crystalline polyester and the amorphous polyester in the binder resin is preferably from 50 mass % to 100 mass %, more preferably from 80 mass % to 100 mass %, yet more preferably from 90 mass % to 100 mass %, and even yet more preferably from 95 mass % to 100 mass %.

The content ratio of the amorphous polyester in the binder resin is preferably from 80.0 mass % to 97.0 mass %, more preferably from 85.4 mass % to 95.1 mass %, and yet more preferably from 88.0 mass % to 92.0 mass %.

Preferably, the peak molecular weight of the amorphous polyester is from 3500 to 20000, from the viewpoint of low-temperature fixing performance and abrasion resistance. Preferably, the acid value of the amorphous polyester is from 5 mgKOH/g to 30 mgKOH/g, from the viewpoint of charge retention in high-temperature, high-humidity environments. Preferably, the hydroxyl value of the amorphous polyester is from 20 mgKOH/g to 70 mgKOH/g, from the viewpoint of low-temperature fixing performance and charge retention.

Crystalline Polyester

As the monomers used in the crystalline polyester there are preferably utilized a polyhydric alcohol (dihydric, trihydric or higher alcohol) and a polyvalent carboxylic acid (divalent, trivalent or higher carboxylic acid), an acid anhydride thereof, or a lower alkyl ester thereof. The main chain of the crystalline polyester is preferably a condensation polymer of an aliphatic dicarboxylic acid and an aliphatic diol.

The polyhydric alcohol monomers below can be used as the polyhydric alcohol monomer that is utilized in the crystalline polyester. The polyvalent alcohol monomer is not particularly limited, but is preferably a chain (more preferably linear) aliphatic diol, for instance ethylene glycol, diethylene glycol, triethylene glycol, 1,2-propylene glycol, 1,3-propylene glycol, dipropylene glycol, 1,4-butanediol, 1,4-butadiene glycol, trimethylene glycol, tetramethylene glycol, pentamethylene glycol, hexamethylene glycol, octamethylene glycol, nonamethylene glycol, decamethylene glycol or neopentyl glycol. Particularly preferred examples among the foregoing are linear aliphatic α,ω-diols such as ethylene glycol, diethylene glycol, 1,4-butanediol and 1,6-hexanediol.

A polyhydric alcohol monomer other than the above polyhydric alcohol can also be used herein. Examples of dihydric alcohol monomers among the above polyhydric alcohol monomers include aromatic alcohols such as polyoxyethylene bisphenol A and polyoxypropylene bisphenol A; as well as 1,4-cyclohexanedimethanol. Examples of trihydric or higher polyhydric alcohol monomers from among the above polyhydric alcohol monomers include aromatic alcohols such as 1,3,5-trihydroxymethylbenzene, as well as aliphatic alcohols such as pentaerythritol, dipentaerythritol, tripentaerythritol, 1,2,4-butanetriol, 1,2,5-pentanetriol, glycerin, 2-methylpropanetriol, 2-methyl-1,2,4-butanetriol, trimethylolethane and tritrimethylolpropane.

The polyvalent carboxylic acid monomers below can be used as the polyvalent carboxylic acid monomer that is used in the crystalline polyester. The polyvalent carboxylic acid monomer is not particularly limited, but is preferably a chain (more preferably linear) aliphatic dicarboxylic acid. Concrete examples thereof include oxalic acid, malonic acid, succinic acid, glutaric acid, adipic acid, pimelic acid, suberic acid, glutaconic acid, azelaic acid, sebacic acid, nonanedicarboxylic acid, decanedicarboxylic acid, undecanedicarboxylic acid, dodecanedicarboxylic acid, maleic acid, fumaric acid, mesaconic acid, citraconic acid and itaconic acid, as well as hydrolysis products of acid anhydrides and lower alkyl esters of the foregoing.

A polyvalent carboxylic acid other than the above polyvalent carboxylic acid monomers can also be used herein. Examples of divalent carboxylic acids among such other polyvalent carboxylic acid monomers include aromatic carboxylic acids such as isophthalic acid and terephthalic acid; aliphatic carboxylic acids such as n-dodecylsuccinic acid and n-dodecenylsuccinic acid; and alicyclic carboxylic acids such as cyclohexanedicarboxylic acid, as well as acid anhydrides and lower alkyl esters of the foregoing.

Examples of trivalent or higher polyvalent carboxylic acids among the above other carboxylic acid monomers include aromatic carboxylic acids such as 1,2,4-benzenetricarboxylic acid (trimellitic acid), 2,5,7-naphthalenetricarboxylic acid, 1,2,4-naphthalenetricarboxylic acid and pyromellitic acid, and aliphatic carboxylic acids such as 1,2,4-butanetricarboxylic acid, 1,2,5-hexanetricarboxylic acid and 1,3-dicarboxyl-2-methyl-2-methylene carboxypropane, as well as derivatives of the foregoing such as acid anhydrides and lower alkyl esters.

The aliphatic dicarboxylic acid is a C2 to C16 (preferably C8 to C14) linear aliphatic dicarboxylic acid. The aliphatic diol is a C2 to C16 (preferably C8 to C14) linear aliphatic diol. The content ratio of monomer units resulting from polymerization of a C2 to C16 (preferably C8 to C14) linear aliphatic dicarboxylic acid is preferably from 8 mass % to 45 mass %, more preferably from 20 mass % to 35 mass %. The content ratio of monomer units resulting from polymerization of a C2 to 16 (preferably C8 to C14) linear aliphatic diol is preferably from 15 mass % to 50 mass %, more preferably from 25 mass % to 45 mass %.

Herein, (ii) the crystalline polyester contains a modified crystalline polyester that has at least one terminal-modified structure selected from among a structure in which a hydroxy group at a main chain terminal is terminal-modified with a C16 to C31 aliphatic monocarboxylic acid and a structure in which a carboxy group at a main chain terminal is terminal-modified with a C15 to C30 aliphatic monoalcohol. Preferably, the crystalline polyester is the above modified crystalline polyester. The content ratio of the modified crystalline polyester in the crystalline polyester is preferably from 50 mass % to 100 mass %, more preferably from 80 mass % to 100 mass %, yet more preferably from 90 mass % to 100 mass %, even yet more preferably from 95 mass % to 100 mass %, and is particularly preferably 100 mass %.

Examples of the C16 to C31 aliphatic monocarboxylic acid include palmitic acid (hexadecanoic acid), margaric acid (heptadecanoic acid), stearic acid (octadecanoic acid), nonadecylic acid, arachidic acid (eicosanoic acid), heneicosanoic acid, behenic acid (docosanoic acid), tetracosanoic acid, hexacosanoic acid, octacosanoic acid and triacontanoic acid.

Examples of C15 to C30 aliphatic monoalcohols include palmityl alcohol (hexadecanol), margaryl alcohol (heptadecanol), stearyl alcohol (octadecanol), nonadecanol, arachidyl alcohol (eicosanol), heneicosanol, behenyl alcohol, lignoceryl alcohol, ceryl alcohol, 1-heptacosanol, montanyl alcohol, 1-nonacosanol and myricyl alcohol.

The content ratio of the crystalline polyester in the binder resin is preferably from 3.0 mass % to 20.0 mass %, more preferably from 4.9 mass % to 14.6 mass %, and yet more preferably from 8.0 mass % to 12.0 mass %. The above ranges are preferable from the viewpoint of low-temperature fixing performance, abrasion resistance, and charge retention in high-temperature, high-humidity environments. The melting point of the crystalline polyester is preferably from 60 to 100° C., more preferably from 65 to 90° C., and yet more preferably from 70 to 85° C.

The crystalline polyester can be produced in accordance with an ordinary polyester synthesis method. For instance a carboxylic acid monomer and an alcohol monomer exemplified above can be subjected to an esterification reaction or transesterification reaction, followed by a polycondensation reaction in accordance with an ordinary method, under reduced pressure or under introduction of nitrogen gas, so that a crystalline polyester resin can be obtained as a result. A desired crystalline polyester resin can be subsequently obtained through addition of the above aliphatic compound, with an esterification reaction.

The above esterification or transesterification reaction can be conducted, as the case may require, using an ordinary esterification catalyst or transesterification catalyst such as sulfuric acid, titanium butoxide, dibutyltin oxide, manganese acetate or magnesium acetate.

Further, the polycondensation reaction can be carried out using an ordinary polymerization catalyst, for instance a known catalyst such as titanium butoxide, dibutyltin oxide, tin acetate, zinc acetate, tin disulfide, antimony trioxide or germanium dioxide. The polymerization temperature and the amount of catalyst are not particularly limited, and may be established as appropriate.

In the esterification or transesterification reaction, or polycondensation reaction, a method may be resorted to in which all the monomers are added at once, for the purpose of increasing the strength of the crystalline polyester that is obtained, in which divalent monomers are caused to react first, in order to reduce the amount of the low molecular weight component, followed by addition and reaction of trivalent and higher monomers, or the like.

To synthesize a crystalline polyester that includes a modified crystalline polyester, preferably an aliphatic diol and an aliphatic dicarboxylic acid, and at least one selected from the group consisting of the above aliphatic monocarboxylic acids and aliphatic monoalcohols (preferably the above aliphatic monocarboxylic acids), are caused to undergo polycondensation. The proportion of the aliphatic diol is preferably from 30 to 50 mol %, more preferably from 35 to 45 mol %, and the proportion of the aliphatic dicarboxylic acid is preferably from 5 to 45 mol %, more preferably from 10 to 35 mol %. The proportion of at least one selected from the group consisting of the above aliphatic monocarboxylic acids and aliphatic monoalcohols (preferably, the above aliphatic monocarboxylic acids) is preferably from 15 to 60 mol %, more preferably from 20 to 30 mol %.

The toner particle may contain a wax. Examples of the wax include the following: hydrocarbon type waxes such as low molecular weight polyethylene, low molecular weight polypropylene, alkylene copolymers, microcrystalline wax, paraffin wax and Fischer-Tropsch waxes; oxides of hydrocarbon type waxes or block copolymers thereof, such as polyethylene oxide wax; waxes the main component of which is a fatty acid ester, such as carnauba wax; partially or fully deoxidized fatty acid esters, such as deoxidized carnauba wax; saturated linear fatty acids such as palmitic acid, stearic acid and montanic acid; unsaturated fatty acids such as brassidic acid, eleostearic acid and parinaric acid; saturated alcohols such as stearyl alcohol, aralkyl alcohols, behenyl alcohol, carnaubyl alcohol, ceryl alcohol and melissyl alcohol; polyhydric alcohols such as sorbitol; esters of fatty acids such as palmitic acid, stearic acid, behenic acid or montanic acid with alcohols such as stearyl alcohol, aralkyl alcohols, behenic alcohol, carnaubyl alcohol, ceryl alcohol or melissyl alcohol; fatty acid amides such as linoleamide, oleamide and lauramide; saturated fatty acid bisamides such as methylene bis(stearamide), ethylene bis (capramide), ethylene bis(lauramide) and hexamethylene bis(stearamide); unsaturated fatty acid amides such as ethylene bis(oleamide), hexamethylene bis(oleamide), N,N'-dioleyladipamide and N,N'-dioleylsebacamide; aromatic bisamides such as m-xylene bis(stearamide) and N,N'-distearyl isophthalamide; fatty acid metal salts (generally referred to as metal soaps) such as calcium stearate, calcium laurate, zinc stearate and magnesium stearate; aliphatic hydrocarbon waxes grafted with vinylic monomers such as styrene or acrylic acid; partially esterified products of fatty acids and polyhydric alcohols such as behenic acid monoglyceride; and methyl ester compounds having hydroxyl groups and obtained through hydrogenation of plant-based oils and fats.

Preferred among the foregoing are ester waxes and hydrocarbon waxes. Hydrocarbon waxes such as paraffin wax and Fischer-Tropsch waxes are more preferable, from the viewpoint of abrasion resistance. The melting point of the wax is preferably from 60 to 120° C., more preferably from 65 to 90° C., and yet more preferably from 70 to 90° C. The content of wax is preferably from 3 parts by mass to 8 parts by mass relative to 100 parts by mass of the binder resin, from the viewpoint of abrasion resistance.

Colorant

The toner particle may contain a colorant, as needed. Examples of the colorant include those listed below. Examples of black colorants include carbon black, and colorants resulting from color matching of yellow colorants, magenta colorants and cyan colorants to black. As the colorant there may be used a pigment singly, or a dye and a pigment in combination. Preferably, a dye and a pigment are used concomitantly, from the viewpoint of image quality in full-color images.

Examples of pigments for a magenta toner are presented hereinbelow. C. I. Pigment Red 1, 2, 3, 4, 5, 6, 7, 8, 9, 10, 11, 12, 13, 14, 15, 16, 17, 18, 19, 21, 22, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, 282; C. I. Pigment Violet 19; C. I. Vat Red 1, 2, 10, 13, 15, 23, 29, 35.

Examples of dyes for a magenta toner are presented hereinbelow. C. I. Solvent Red 1, 3, 8, 23, 24, 25, 27, 30, 49, 81, 82, 83, 84, 100, 109, 121; C. I. Disperse Red 9; C. I. Solvent Violet 8, 13, 14, 21, 27; oil-soluble dyes such as C. I. Disperse Violet 1, C. I. Basic Red 1, 2, 9, 12, 13, 14, 15, 17, 18, 22, 23, 24, 27, 29, 32, 34, 35, 36, 37, 38, 39, 40; and basic dyes such as C. I. Basic Violet 1, 3, 7, 10, 14, 15, 21, 25, 26, 27, 28.

Examples of pigments for a cyan toner are presented hereinbelow. C. I. Pigment Blue 2, 3, 15:2, 15:3, 15:4, 16, 17; C. I. Vat Blue 6; C. I. Acid Blue 45, and copper phthalocyanine pigments having a phthalocyanine skeleton substituted with 1 to 5 phthalimidomethyl groups. Dyes for a cyan toner are exemplified by C. I. Solvent Blue 70.

Examples of pigments for a yellow toner are presented hereinbelow. C. I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, 185; C. I. Vat Yellow 1, 3, 20. Dyes for a yellow toner are exemplified by C. I. Solvent Yellow 162.

These colorants can be used singly or in a mixture, or in the form of a solid solution. The colorant is selected in consideration of hue angle, saturation, lightness, light resistance, OHP transparency, and dispersibility in toner particle.

The content of the colorant is preferably 0.1 parts by mass to 30.0 parts by mass with respect to 100 parts by mass of the binder resin.

Charge Control Agent

The toner particle may contain a charge control agent, as needed. By incorporating a charge control agent it becomes possible to stabilize charge characteristics and to control a triboelectric charge quantity optimized for the developing system. A known agent can be used as the charge control agent, but particularly preferred are metal compounds of aromatic carboxylic acids, which are colorless, afford high toner charging speed, and are capable of holding stably a constant charge quantity.

Examples of negative-type charge control agents include metal salicylate compounds, metal naphthoate compounds, metal dicarboxylate compounds, polymeric compounds having a sulfonic acid or a carboxylic acid in a side chain, polymeric compounds having a sulfonate salt or sulfonic acid esterification product in a side chain, polymeric compounds having a carboxylate or carboxylic acid esterification product in a side chain, boron compounds, urea compounds, silicon compounds, and calixarenes.

The charge control agent may be added internally or externally to the toner particle. The content of the charge control agent is preferably from 0.2 parts by mass to 10.0 parts by mass, more preferably from 0.5 parts by mass to 10.0 parts by mass, relative to 100 parts by mass of the binder resin.

Inorganic Fine Particles

The toner may contain inorganic fine particles, as needed. The inorganic fine particles may be added internally to the toner particle, or may be mixed, with the toner, as an external additive.

Examples of the inorganic fine particles include fine particles such as silica fine particles, titanium oxide fine particles, alumina fine particles, and double oxide fine particles of the foregoing. Among inorganic fine particles, silica fine particles and titanium oxide fine particles are preferred for the purpose of improving flowability and uniformizing charge. The inorganic fine particles are preferably hydrophobized using a hydrophobic agent such as a silane compound, a silicone oil, or a mixture thereof.

Preferably, the specific surface area of the inorganic fine particles as an external additive is from 50 $m^2/g$ to 400 $m^2/g$, from the viewpoint of improving flowability. The specific surface area of the inorganic fine particles as an external additive is preferably from 10 $m^2/g$ to 50 $m^2/g$, from the viewpoint of improving durability stability. Inorganic fine particles having a specific surface area lying in the above range may be used in combination, in order to achieve both improved flowability and durability stability.

The content of the external additive is preferably from 0.1 parts by mass to 10.0 parts by mass relative to 100 parts by mass of the toner particle. A known mixer such as a Henschel mixer can be used for mixing the toner particle and the external additive.

Developer

The toner can be used as a one-component developer, but may also be mixed with a magnetic carrier and be used as a two-component developer, in order to further improve dot reproducibility and also in order to achieve a stable image over long periods of time.

Magnetic carriers include generally known materials such as, for example, iron oxide; metal particles such as iron, lithium, calcium, magnesium, nickel, copper, zinc, cobalt, manganese, chromium and rare earths, alloy particles thereof, and oxide particles thereof; magnetic bodies such as ferrites; magnetic body-dispersed resin carriers (the so-called resin carriers) including a binder resin in which the magnetic bodies are held in a dispersed state; and the like.

When the toner is mixed with a magnetic carrier and used as a two-component developer, the mixing ratio of the magnetic carrier at that time is preferably from 2% by mass to 15% by mass, and more preferably 4% by mass to 13% by mass as the toner concentration in the two-component developer.

Method for Producing a Toner Particle

The method for producing the toner particle is not particularly limited, and known methods such as pulverization, suspension polymerization, dissolution suspension, emulsification aggregation, dispersion polymerization and the like may be resorted to. A method for producing a toner by pulverization will be explained next. The pulverization method includes a step of melt-kneading a crystalline polyester and an amorphous polyester, as binder resins, and other components such as wax, a colorant and a charge control agent, as needed, to yield a resin composition, and a step of pulverizing the obtained resin composition, to yield a toner particle.

In a raw material mixing step, for example, a binder resin, and, if necessary, other components such as a wax, a colorant, and a charge control agent are weighed in predetermined amounts, compounded and mixed as materials constituting toner particles. Examples of the mixing apparatus include a double-cone mixer, a V-type mixer, a drum mixer, a super mixer, a Henschel mixer, a NAUTA mixer, and a MECHANO HYBRID (manufactured by Nippon Coke Industry Co., Ltd.).

Next, the mixed materials are melt-kneaded to disperse the materials in the binder resin. In the melt-kneading process, a batch-type kneader such as a pressure kneader or a Banbury mixer, or a continuous-type kneader can be used, and a single- or twin-screw extruder is mainly used because of its superiority of continuous production. Specific examples include a KTK type twin-screw extruder (manufactured by Kobe Steel, Ltd.), a TEM type twin-screw extruder (manufactured by Toshiba Machine Co., Ltd.), a PCM kneader (made by Ikegai Corp.), a twin-screw extruder (manufactured by KCK Co.), Co-Kneader (manufactured by Buss AG) and KNEADEX (manufactured by Nippon Coke & Engineering Co., Ltd.). Furthermore, the resin composition obtained by melt-kneading may be rolled with a two-roll mill or the like, and may be cooled with water or the like in the cooling step.

The cooled resin composition is then pulverized to the desired particle size in the pulverization step. In the pulverization step, coarse pulverization is performed with a pulverizing device such as, for example, a crusher, a hammer mill, or a feather mill. Thereafter, for example, the material is finely pulverized by a KRYPTON system (manufactured by Kawasaki Heavy Industries, Ltd.), SUPER ROTOR (manufactured by Nisshin Engineering Co., Ltd.), TURBO MILL (manufactured by Turbo Kogyo) or an air jet type fine pulverizing device.

After that, if necessary, classification is performed using a classifier or sieving machine such as ELBOW JET (manufactured by Nittetsu Mining Co., Ltd.) of an inertial classification type, TURBOPLEX (manufactured by Hosokawa Micron Corporation) of a centrifugal classification type, TSP Separator (manufactured by Hosokawa Micron Corporation), or FACULTY (manufactured by Hosokawa Micron Corporation).

The obtained toner particle may be used, as-is, as the toner. An external additive may be externally added to the surface of the toner particle, as the case may require, to thereby yield a toner. The method involved in an external addition treatment may include mixing a predetermined amount of various known external additives with a classified toner, and stirring and mixing the whole using an external addition apparatus in the form of a mixing device such as a double-cone mixer, a V-type mixer, a drum-type mixer, a super mixer, a Henschel mixer, a Nauta mixer, Mechano Hybrid (by Nippon Coke & Engineering Co., Ltd.) or Nobilta (by Hosokawa Micron Corporation).

Methods for measuring various physical properties will be described below.

Method for Separating Materials from Toner

Each of the materials contained in the toner can be separated from the toner by exploiting differences in the solubilities, in a solvent, of the materials.

First separation: the toner is dissolved in methyl ethyl ketone (MEK) at 23° C., to separate a soluble matter (amorphous polyester) and an insoluble matter (crystalline polyester, wax (release agent), colorant, inorganic fine particles and so forth).

Second separation: the insoluble matter (crystalline polyester, wax, colorant, inorganic fine particles and so forth) obtained in the first separation is dissolved in MEK at 100° C., to separate a soluble matter (crystalline polyester and wax) from an insoluble matter (colorant, inorganic fine particles and so forth).

Third separation: the soluble matter (crystalline polyester and wax) obtained in the second separation is dissolved in chloroform at 23° C., to separate a soluble matter (crystalline polyester) and an insoluble matter (wax).

Method for Measuring the Content Ratio of Monomer Units of Various Polymerizable Monomers in the Amorphous Polyester and Crystalline Polyester The content ratio of monomer units of various polymerizable monomers in the amorphous polyester and the crystalline polyester is measured by $^{1}H$-NMR, under the following conditions.

Measuring device: FT NMR device JNM-EX400 (by JEOL Ltd.)
Measurement frequency: 400 MHz
Pulse conditions: 5.0 μs
Frequency range: 10500 Hz
Number of scans: 64 scans
Measurement temperature: 30° C.
Sample: a sample is prepared by placing 50 mg of a measurement sample in a sample tube having an inner diameter of 5 mm, with addition of deuterated chloroform ($CDCl_3$) as a solvent, followed by dissolution in a thermostatic bath at 40° C.

On the basis of the obtained $^1$H-NMR chart there are calculated integration values $S_1$, $S_2$, $S_3$ . . . $S_n$ of the peaks attributed to the constituent components of the monomer units of the various polymerizable monomers. Herein $S_1$ is the integration value of a peak attributed to a constituent component of monomer units of a first polymerizable monomer, $S_2$ is the integration value of a peak attributed to a constituent component of monomer units of a second polymerizable monomer, and $S_n$ is the integration value of a peak attributed to a constituent component of monomer units of an n-th polymerizable monomer. The content ratios of the monomer units of the various polymerizable monomers are worked out in the manner below, using the above integration values $S_1$, $S_2$, $S_3$ and $S_n$. Further, $n_1$, $n_2$, $n_3$ . . . $n_n$ are the number of hydrogen atoms among the constituent components to which there are attributed the peaks of interest for each segment.

$$\text{Content ratio (mol \%) of monomer unit from } n\text{-th polymerizable monomer (mol \%)}=\{(S_n/n_n)/((S_1/n_1)+(S_2/n_2)+(S_3/n_3)\ldots+(S_n/n_n))\}\times 100$$

The molecular term in a similar operation is modified to calculate the amount of monomer units from the various polymerizable monomers. In a case where a polymerizable monomer is used in which monomer units from various polymerizable monomers contain no hydrogen atom, the above content ratio is calculated in the same way as in $^1$H-NMR but resorting to $^{13}$C-NMR instead, using $^{13}$C as the measurement nucleus, in a single-pulse mode.

Method for Calculating SP Values

The $SP_A$ value of the amorphous polyester, the $SP_{A1}$, $SP_{A2}$, $SP_{A3}$ and $SP_{An}$ value of the monomer units of respective polymerizable monomers of the amorphous polyester, the $SP_C$ value of the crystalline polyester, the $SP_{C1}$, $SP_{C2}$, $SP_{C3}$, and $SP_{Cn}$ values of the monomer units of respective polymerizable monomers of the crystalline polyester and the $SP_W$ value of the wax are worked out as described below, in accordance with the calculation method proposed by Fedors.

The evaporation energy (Δei) (cal/mol) and molar volume (Δvi) ($cm^3$/mol) of atoms or atomic groups in the molecular structure of each of the above polymerizable monomers and wax are worked out on the basis of the tables given in "Polym. Eng. Sci., 14 (2), 147-154 (1974)", where $(\Sigma\Delta ei/\Sigma\Delta vi)^{0.5}$ is taken as the respective SP value $(cal/cm^3)^{0.5}$.

Further, $SP_A$, $SP_C$ and $SP_W$ are calculated in the manner below. Firstly, the evaporation energy (Δei) and molar volume (Δvi) of the monomer units from respective constituent polymerizable monomers are worked out for each monomer unit, and then there are calculated respective products thereof with the molar ratios (j) of the monomer units in the amorphous polyester, the crystalline polyester and the hydrocarbon wax. The SP value of each monomer unit is then calculated by substituting the sum of the evaporation energies and the sum of the molar volumes of each monomer unit into the following expression.

$$SP\text{ value}=\{(\Sigma j\times\Sigma\Delta ei)/(\Sigma j\times\Sigma\Delta vi)\}^{0.5}$$

Measurement of the Weight-Average Molecular Weight of the Amorphous Polyester by GPC The molecular weight (Mw) of the THF-soluble matter in the amorphous polyester is measured by gel permeation chromatography (GPC) as follows.

First, the sample is dissolved in tetrahydrofuran (THF) over 24 hours at room temperature. The obtained solution is filtered across a "Sample Pretreatment Cartridge" solvent-resistant membrane filter with a pore diameter of 0.2 m (Tosoh Corporation) to obtain the sample solution. The sample solution is adjusted to a THF-soluble component concentration of approximately 0.8 mass %. The measurement is performed under the following conditions using this sample solution.

Instrument: HLC8120 GPC (detector: RI) (Tosoh Corporation)
Columns: 7-column train of Shodex KF-801, 802, 803, 804, 805, 806, and 807 (Showa Denko K.K.)
Eluent: tetrahydrofuran (THF)
Flow rate: 1.0 mL/minute
Oven temperature: 40.0° C.
Sample injection amount: 0.10 mL The molecular weight of the sample is determined using a calibration curve constructed using polystyrene resin standards (for example, product name: "TSK Standard Polystyrene F-850, F-450, F-288, F-128, F-80, F-40, F-20, F-10, F-4, F-2, F-1, A-5000, A-2500, A-1000, and A-500", Tosoh Corporation).

Measurement of Weight-Average Molecular Weight of the Crystalline Polyester by GPC The weight-average molecular weight (Mw) of a soluble matter of the crystalline polyester in o-dichlorobenzene at 100° C. is measured by gel permeation chromatography (GPC), as follows. Firstly, the crystalline polyester is dissolved in o-dichlorobenzene at 100° C. over 1 hour. The obtained solution is then filtered through a solvent-resistant membrane filter "Sample Pretreatment Cartridge" (by Tosoh Corporation) having a pore diameter of 0.2 m, to obtain a sample solution. The sample solution is adjusted so that the concentration of the component soluble in o-dichlorobenzene is about 0.1 mass %. This sample solution is used for a measurement under the conditions below.

Device: HLC-8121GPC/HT (by Tosoh Corporation)
Column: two columns TSKgel GMHHR-H HT (7.8 cm I.D×30 cm) (by Tosoh Corporation)
Detector: high-temperature RI
Temperature: 135° C.
Solvent: o-dichlorobenzene
Flow rate: 1.0 mL/min
Sample: 0.4 mL injection of 0.1 mass % sample To calculate the molecular weight of the sample there is used a molecular weight calibration curve created utilizing a monodisperse polystyrene standard sample. The molecular weight is then calculated, by polyethylene conversion, in accordance with a conversion expression derived from the Mark-Houwink viscosity equation.

Measurement of the Melting Points ($T_W$, $T_C$) of the Crystalline Polyester and the Wax The melting points ($T_W$, $T_C$) of the crystalline polyester and the wax are measured according to ASTM D3418-82 using a differential scanning calorimeter (product name: Q2000, by TA Instruments Inc.). The temperature at the detection unit of the instrument is corrected on the basis of melting points of indium and zinc, and the amount of heat is corrected on the basis of heat of fusion of indium.

Specifically, 3 mg of sample are weighed exactly, and are placed on a pan made of aluminum; a measurement is then carried out under the conditions below using an empty aluminum-made pan as a reference.

Ramp rate: 10° C./min

Measurement start temperature: 30° C.

Measurement end temperature: 180° C.

The measurement is performed in a measurement range from 30 to 180° C. at a ramp rate of 10° C./min. The sample is heated once up to 180° C., is held at that temperature for 10 minutes, is subsequently cooled down to 30° C., and is thereafter heated up once again. The temperature of the maximum endothermic peak of a temperature-endothermic quantity curve in a range from 30 to 100° C., in this second temperature rise process, is taken as the melting point.

Measurement of the Endothermic Quantity (ΔH) of the Crystalline Polyester

The endothermic quantity derived from the crystalline polyester is measured according to ASTM D3418-82 using a differential scanning calorimeter (product name: Q2000, by TA Instruments Inc.). The temperature at the detection unit of the instrument is corrected on the basis of melting points of indium and zinc, and the amount of heat is corrected on the basis of heat of fusion of indium. Specifically, 3 mg of toner are weighed exactly, and are placed on a pan made of aluminum; a measurement is then carried out under the conditions below using an empty aluminum-made pan as a reference.

Ramp rate: 10° C./min

Measurement start temperature: 30° C.

Measurement end temperature: 180° C.

The measurement is performed at a temperature rise rate of 10° C./min in a measurement range of 30 to 180° C. The sample is heated once up to 180° C., is held at that temperature for 10 minutes, is subsequently cooled down to 30° C., and is thereafter heated up once again. In this second temperature rise process an endothermic peak is obtained with respect to the baseline, in the range from 30° C. to 100° C., whereupon the endothermic amount is calculated through integration. Whether the obtained endothermic quantity is derived or not from the crystalline polyester is then determined on the basis of the melting points obtained by ascertaining the melting points of the respective materials having been separated as described above (method for separating materials from the toner).

Method for Measuring the Acid Value of the Crystalline Polyester

The acid value is the number of mg of potassium hydroxide necessary for neutralizing the acid contained in 1 g of a sample. The acid value of the crystalline polyester is measured according to JIS-K0070-1992, specifically by following the procedure below.

(1) Preparation of Reagents

Herein 1.0 g of phenolphthalein is dissolved in 90 mL of ethyl alcohol (95 vol %), with addition of ion-exchanged water up to 100 mL, to obtain a phenolphthalein solution. Then 7 g of special-grade potassium hydroxide are dissolved in 5 mL of water, and ethyl alcohol (95 vol %) is added up to 1 L. The resulting solution is placed in an alkali-resistant container, so as to preclude contact with carbon dioxide, and is allowed to stand for 3 days, followed by filtration, to yield a potassium hydroxide solution. The obtained potassium hydroxide solution is stored in an alkali-resistant container. To work out the factor of the potassium hydroxide solution, 25 mL of 0.1 mol/L hydrochloric acid are placed in an Erlenmeyer flask, several drops of the phenolphthalein solution are added, and titration is carried out using the above potassium hydroxide solution, the factor being then worked out on the basis of the amount of the above potassium hydroxide solution necessary for neutralization. Hydrochloric acid produced in accordance with JIS-K8001-1998 is used as the above 0.1 mol/L hydrochloric acid.

(2) Operation (A) Main Test

Herein 2.0 g of a sample of the pulverized crystalline polyester is weighed exactly in an Erlenmeyer flask of 200 mL, followed by addition of 100 mL of a toluene/ethanol (2:1) mixed solution, and subsequent dissolution over 5 hours. A few drops of the phenolphthalein solution are added next as an indicator, and titration is performed using the above potassium hydroxide solution. The end point of the titration occurs when the light red color of the indicator persists for 30 seconds.

(B) Blank Test

Titration is performed in the same way as above but herein no sample is used (i.e. only a mixed solution of toluene/ethanol (2:1) is used)

(3) The Acid Value is then Calculated by Plugging the Obtained Results into the Expression Below.

$$A=[(C-B)\times f\times 5.61]/S$$

In the expression, A: acid value (mgKOH/g), B: addition amount (mL) of the potassium hydroxide solution in the blank test, C: addition amount (mL) of the potassium hydroxide solution in the main test, f: factor of the potassium hydroxide solution, and S: mass (g) of the sample.

Method for Measuring the Hydroxyl Value OHv of the Crystalline Polyester

The hydroxyl value is the number of milligrams of potassium hydroxide required to neutralize the acetic acid bonded with the hydroxyl group when 1 g of the sample is acetylated. The hydroxyl value of the crystalline polyester is measured based on JIS K 0070-1992 and in specific terms is measured according to the following procedure.

(1) Reagent Preparation 25 g of special-grade acetic anhydride is introduced into a 100-mL volumetric flask; the total volume is brought to 100 mL by the addition of pyridine; and thorough shaking then provides the acetylation reagent. The obtained acetylation reagent is stored in a brown bottle isolated from contact with, e.g., humidity, carbon dioxide, and so forth.

A phenolphthalein solution is obtained by dissolving 1.0 g of phenolphthalein in 90 mL of ethyl alcohol (95 vol %) and bringing to 100 mL by the addition of deionized water.

35 g of special-grade potassium hydroxide is dissolved in 20 mL of water and this is brought to 1 L by the addition of ethyl alcohol (95 vol %). After standing for 3 days in an alkali-resistant container isolated from contact with, e.g., carbon dioxide, filtration is performed to obtain a potassium hydroxide solution. The obtained potassium hydroxide solution is stored in an alkali-resistant container. The factor for this potassium hydroxide solution is determined as follows: 25 mL of 0.5 mol/L hydrochloric acid is taken to an Erlenmeyer flask; several drops of the above-described phenolphthalein solution are added; titration is performed with the potassium hydroxide solution; and the factor is determined from the amount of the potassium hydroxide solution required for neutralization. The 0.5 mol/L hydrochloric acid used is prepared in accordance with JIS K 8001-1998.

(2) Procedure (A) Main Test

A 1.0 g sample of the pulverized crystalline polyester is exactly weighed into a 200-mL roundbottom flask and exactly 5.0 mL of the above-described acetylation reagent is added from a whole pipette. When the sample is difficult to dissolve in the acetylation reagent, dissolution is carried out by the addition of a small amount of special-grade toluene.

A small funnel is mounted in the mouth of the flask and heating is then carried out by immersing about 1 cm of the bottom of the flask in a glycerol bath at approximately 97° C. In order at this point to prevent the temperature at the neck of the flask from rising due to the heat from the bath, thick paper in which a round hole has been made is preferably mounted at the base of the neck of the flask.

After 1 hour, the flask is taken off the glycerol bath and allowed to cool. After cooling, the acetic anhydride is hydrolyzed by adding 1 mL of water from the funnel and shaking. In order to accomplish complete hydrolysis, the flask is again heated for 10 minutes on the glycerol bath. After cooling, the funnel and flask walls are washed with 5 mL of ethyl alcohol.

Several drops of the above-described phenolphthalein solution are added as the indicator and titration is performed using the above-described potassium hydroxide solution. The endpoint for the titration is taken to be the point at which the pale pink color of the indicator persists for approximately 30 seconds.

(B) Blank Test

Titration is performed using the same procedure as described above, but without using the crystalline polyester sample.

(3) The Hydroxyl Value is Calculated by Substituting the Obtained Results into the Following Formula.

$$A=[\{(B-C)\times 28.05\times f\}/S]+D$$

Here, A: the hydroxyl value (mg KOH/g); B: the amount of addition (mL) of the potassium hydroxide solution in the blank test; C: the amount of addition (mL) of the potassium hydroxide solution in the main test; f: the factor for the potassium hydroxide solution; S: the sample (g); and D: the acid value (mg KOH/g) of the crystalline polyester.

Method for Calculating the Proportion of Terminal-Modified Structure

The proportion of terminal-modified structure in the crystalline polyester is calculated using the acid value, hydroxyl value and molecular weight worked out above. Specifically, the number of moles of terminal functional groups in 1 g of the crystalline polyester is calculated using the expression below.

Number of moles of terminal functional groups=(acid value+hydroxyl value)/(1000×56.105)

The number of moles in 1 g of the crystalline polyester is then calculated on the basis of the molecular weight of the crystalline polyester.

Number of moles in 1 g of crystalline polyester=1/Mw

The amount of terminal functional groups is calculated from the ratios of the monomer units of the crystalline polyester, as calculated by NMR above. Specifically, the amount of functional groups is 2 in an ester product of a dicarboxylic acid and a dialcohol. When using trivalent or higher monomers it suffices to calculate the amount of terminal functional groups on the basis of the molar ratios of these monomers.

Proportion (mol %) of terminal-modified structure in the crystalline polyester=[1−number of moles of terminal functional groups/(number of moles in 1 g of crystalline polyester×amount of functional groups)]×100

EXAMPLES

The present invention will be explained in further detail hereafter on the basis of examples, but these examples are not meant to limit the present invention in any way. Unless otherwise specified, the language "parts" in the formulations below refers to parts by mass in all instances.

Production Example of Crystalline Polyester C1

Dodecanediol: 40.0 parts (42.6 mol %)
Dodecanedioic acid: 25.0 parts (30.6 mol %)
Behenic acid: 35.0 parts (26.8 mol %)
Titanium tetrabutoxide (esterification catalyst): 0.5 parts The above materials were weighed in a reaction vessel equipped with a cooling tube, a stirrer, a nitrogen introduction tube and a thermocouple. Next, the interior of the reaction vessel was purged with nitrogen gas, and thereafter the temperature was gradually raised while under stirring; the reaction was conducted for 2 hours while under stirring at a temperature of 200° C. Further, the pressure in the reaction vessel was lowered to 8.3 kPa, the reaction was conducted for 5 hours while maintaining the temperature at 200° C., and then the temperature was lowered, to thereby to stop the reaction and yield Crystalline polyester C1. The obtained Crystalline polyester C1 had a weight-average molecular weight Mw of 2000, a terminal-modified structure proportion of 98.5 mol %, a total of acid value and hydroxyl value of 0.8 mgKOH/g, and a melting point $T_C$ of 72.0° C.

An NMR analysis of Crystalline polyester C1 above revealed the presence of monomer units from polymerizable monomers at proportions similar to those of the in the above formulation. The value of $SP_C$ was 9.1 $(cal/cm^3)^{0.5}$. The difference in the number of carbon atoms between the aliphatic dicarboxylic acid and the aliphatic diol was 0.

Production Examples of Crystalline Polyesters C2 to C17

Crystalline polyesters C2 to C17 were obtained by conducting a reaction in the same way as in the production example of Crystalline polyester C1, but modifying herein the polymerizable monomers, number of parts and reaction times as given in Table 1 and Table 3. The physical properties of Crystalline polyesters C2 to C17 are given in Tables 2 and 3. Crystalline polyesters C2 to C17 contained monomer units from polymerizable monomers at proportions similar to those of the formulations in Table 1.

TABLE 1

| Crystalline polyester | First polymerizable monomer | | | Second polymerizable monomer | | | Third polymerizable monomer | | |
|---|---|---|---|---|---|---|---|---|---|
| C No. | Type | Parts | mol % | Type | Parts | mol % | Type | Parts | mol % |
| 1 | DDG | 40.0 | 42.6 | DDA | 25.0 | 30.6 | BA | 35.0 | 26.8 |
| 2 | OG | 35.0 | 44.3 | DDA | 30.0 | 32.2 | BA | 35.0 | 23.5 |
| 3 | HG | 30.0 | 43.9 | DDA | 30.0 | 30.6 | BA | 40.0 | 25.5 |

TABLE 1-continued

| Crystalline polyester | First polymerizable monomer | | | Second polymerizable monomer | | | Third polymerizable monomer | | |
|---|---|---|---|---|---|---|---|---|---|
| C No. | Type | Parts | mol % | Type | Parts | mol % | Type | Parts | mol % |
| 4 | DDG | 30.0 | 35.4 | DDA | 10.0 | 13.6 | BA | 60.0 | 51.0 |
| 5 | DDG | 30.0 | 36.3 | DDA | 5.0 | 7.0 | BA | 65.0 | 56.7 |
| 6 | EG | 20.0 | 44.1 | DDA | 40.0 | 34.4 | BA | 40.0 | 21.5 |
| 7 | EG | 23.0 | 48.0 | DDA | 42.0 | 34.2 | BA | 35.0 | 17.8 |
| 8 | DDG | 38.0 | 39.8 | DDA | 30.0 | 36.1 | BA | 32.0 | 24.1 |
| 9 | DDG | 38.0 | 39.4 | DDA | 32.0 | 38.2 | BA | 30.0 | 22.4 |
| 10 | DDG | 40.0 | 41.6 | DDA | 30.0 | 35.9 | BA | 30.0 | 22.5 |
| 11 | DDG | 40.0 | 41.4 | DDA | 31.0 | 37.0 | BA | 29.0 | 21.6 |
| 12 | DDG | 40.0 | 38.4 | DDA | 25.0 | 27.7 | PA | 35.0 | 33.9 |
| 13 | DDG | 45.0 | 49.7 | DDA | 25.0 | 31.8 | MA | 30.0 | 18.6 |
| 14 | DDG | 32.0 | 33.6 | DDA | 33.0 | 39.9 | BA | 35.0 | 26.5 |
| 15 | DDG | 40.0 | 42.6 | DDA | 25.0 | 30.6 | BA | 35.0 | 26.8 |
| 16 | DDG | 40.0 | 42.6 | DDA | 25.0 | 30.6 | BA | 35.0 | 26.8 |
| 17 | DDG | 40.0 | 37.5 | DDA | 25.0 | 27.0 | PE | 35.0 | 35.5 |
| 18 | DDG | 43.0 | 49.2 | DDA | 25.0 | 33.0 | LA | 32.0 | 17.9 |
| 19 | DDG | 31.0 | 32.5 | DDA | 34.0 | 41.1 | BA | 35.0 | 26.4 |
| 20 | DDG | 40.0 | 42.6 | DDA | 25.0 | 30.6 | BA | 35.0 | 26.8 |
| 21 | DDG | 40.0 | 42.6 | DDA | 25.0 | 30.6 | BA | 35.0 | 26.8 |

The abbreviations in Tables 1 to 3 are as follows.
DDG: dodecanediol
DDA: dodecanedioic acid
BA: behenic acid
PA: palmitic acid
PE: pentanoic acid
MA: montanic acid
LA: lacceroic acid
OG: octanediol
HG: hexanediol
EG: ethylene diol

TABLE 2

| Crystalline polyester | Monomer unit of first polymerizable monomer | | Monomer unit of second polymerizable monomer | | Monomer unit of third polymerizable monomer | | |
|---|---|---|---|---|---|---|---|
| C No. | Unit | $SP_{C1}$ | Unit | $SP_{C2}$ | Unit | $SP_{C3}$ | $SP_C$ |
| 1 | DDG | 9.35 | DDA | 9.48 | BA | 8.56 | 9.1 |
| 2 | OG | 9.67 | DDA | 9.48 | BA | 8.56 | 9.2 |
| 3 | HG | 9.97 | DDA | 9.48 | BA | 8.56 | 9.2 |
| 4 | DDG | 9.35 | DDA | 9.48 | BA | 8.56 | 8.9 |
| 5 | DDG | 9.35 | DDA | 9.48 | BA | 8.56 | 8.8 |
| 6 | EG | 11.52 | DDA | 9.48 | BA | 8.56 | 9.4 |
| 7 | EG | 11.52 | DDA | 9.48 | BA | 8.56 | 9.5 |
| 8 | DDG | 9.35 | DDA | 9.48 | BA | 8.56 | 9.1 |
| 9 | DDG | 9.35 | DDA | 9.48 | BA | 8.56 | 9.1 |
| 10 | DDG | 9.35 | DDA | 9.48 | BA | 8.56 | 9.1 |
| 11 | DDG | 9.35 | DDA | 9.48 | BA | 8.56 | 9.1 |
| 12 | DDG | 9.35 | DDA | 9.48 | PA | 8.56 | 9.1 |
| 13 | DDG | 9.35 | DDA | 9.48 | MA | 8.56 | 9.1 |
| 14 | DDG | 9.35 | DDA | 9.48 | BA | 8.56 | 9.1 |
| 15 | DDG | 9.35 | DDA | 9.48 | BA | 8.56 | 9.1 |
| 16 | DDG | 9.35 | DDA | 9.48 | BA | 8.56 | 9.1 |
| 17 | DDG | 9.35 | DDA | 9.48 | PE | 8.56 | 9.1 |
| 18 | DDG | 9.35 | DDA | 9.48 | LA | 8.56 | 9.1 |
| 19 | DDG | 9.35 | DDA | 9.48 | BA | 8.56 | 9.1 |
| 20 | DDG | 9.35 | DDA | 9.48 | BA | 8.56 | 9.1 |
| 21 | DDG | 9.35 | DDA | 9.48 | BA | 8.56 | 9.1 |

In the table, the units of $SP_C$ are $(cal/cm^3)^{0.5}$.

TABLE 3

| Crystalline polyester C No. | Reaction time (h) | Mw | difference of the carbon number | Melting point (° C.) | Ratio of the terminal modification | Acid value + hydroxyl value (mgKOH/g) |
|---|---|---|---|---|---|---|
| 1 | 2 + 5 | 2000 | 0 | 72 | 98.5% | 0.8 |
| 2 | 2 + 5 | 2000 | 4 | 72 | 100.0% | 0.2 |
| 3 | 2 + 5 | 2000 | 6 | 72 | 99.4% | 0.4 |
| 4 | 2 + 5 | 2000 | 0 | 72 | 96.3% | 2.1 |
| 5 | 2 + 5 | 2000 | 0 | 72 | 99.0% | 0.6 |
| 6 | 2 + 5 | 2000 | 0 | 72 | 98.8% | 0.7 |
| 7 | 2 + 5 | 2000 | 0 | 72 | 95.2% | 2.7 |
| 8 | 2 + 5 | 2000 | 0 | 72 | 91.5% | 4.8 |
| 9 | 2 + 5 | 2000 | 0 | 72 | 90.0% | 5.6 |
| 10 | 2 + 5 | 2000 | 0 | 72 | 94.4% | 3.1 |
| 11 | 2 + 5 | 2000 | 0 | 72 | 93.6% | 3.6 |
| 12 | 2 + 5 | 2000 | 0 | 72 | 93.8% | 3.5 |
| 13 | 2 + 5 | 2000 | 0 | 72 | 91.4% | 4.8 |
| 14 | 2 + 5 | 2000 | 0 | 72 | 80.4% | 11.0 |
| 15 | 1 + 2 | 1500 | 0 | 72 | 98.5% | 1.1 |
| 16 | 3 + 6 | 4900 | 0 | 72 | 98.5% | 0.3 |
| 17 | 2 + 5 | 2000 | 0 | 72 | 92.8% | 4.1 |
| 18 | 2 + 5 | 2000 | 0 | 72 | 92.7% | 4.1 |
| 19 | 2 + 5 | 2000 | 0 | 72 | 78.2% | 12.2 |
| 20 | 0.5 + 2 | 1400 | 0 | 72 | 98.5% | 1.2 |
| 21 | 4 + 6 | 5000 | 0 | 72 | 98.5% | 0.3 |

The ratio of the terminal modification is the "Content ratio (mol %) of terminal-modified structure in crystalline polyester".

Production Example of Amorphous Polyester A1

Bisphenol A/PG (propylene oxide) adduct (average number of added moles 2.0): 40.0 parts (12.5 mol %)
Ethylene glycol: 20.0 parts (39.8 mol %)
Terephthalic acid: 40.0 parts (47.7 mol %)
Titanium tetrabutoxide (esterification catalyst): 0.5 parts The above materials were weighed in a reaction vessel equipped with a cooling tube, a stirrer, a nitrogen introduction tube and a thermocouple. Next, the interior of the reaction vessel was purged with nitrogen gas, and thereafter the temperature was gradually raised while under stirring; the reaction was conducted for 2 hours while under stirring at a temperature of 200° C. Further, the pressure in the reaction vessel was lowered to 8.3 kPa, and the reaction was conducted for 5 hours while maintaining the temperature at 200° C.; once the softening point proved to have reached 120° C. in a measurement according to ASTM D36-86, the temperature was lowered to stop the reaction, and yield Amorphous Polyester A1.

An NMR analysis of Amorphous polyester A1 revealed a content of 12.5 mol % of monomer units of polyoxypropylene(2.0)-2,2-bis(4-hydroxyphenyl)propane, 39.8 mol % of monomer units of ethylene glycol, and 47.7 mol % of monomer units of terephthalic acid. The value of $SP_A$ was 11.0 $(cal/cm^3)^{0.5}$.

Production Examples of Amorphous Polyesters A2 to A7

Amorphous polyesters A2 to A7 were obtained by conducting a reaction in the same way as in the production example of Amorphous polyester A1, but modifying herein the polymerizable monomers, number of parts and reaction times as given in Table 4. Table 5 sets out the physical properties of Amorphous polyesters A2 to A7.

TABLE 4

| Amorphous polyester | Polymerizable monomer | | | Polymerizable monomer | | | Polymerizable monomer | | |
|---|---|---|---|---|---|---|---|---|---|
| A No. | Type | Parts | mol % | Type | Parts | mol % | Type | Parts | mol % |
| 1 | PO2 | 40.0 | 12.5 | ED | 20.0 | 39.8 | TPA | 40.0 | 47.7 |
| 2 | PO2 | 55.0 | 25.0 | ED | 8.0 | 23.1 | TPA | 30.0 | 51.9 |
| 3 | PO2 | 70.0 | 35.6 | ED | 5.0 | 16.1 | TPA | 25.0 | 48.3 |
| 4 | PO2 | 25.0 | 6.7 | ED | 25.0 | 42.4 | TPA | 50.0 | 50.9 |
| 5 | PO2 | 15.0 | 3.5 | ED | 35.0 | 52.0 | TPA | 50.0 | 44.5 |
| 6 | PO2 | 75.0 | 44.1 | — | — | — | TPA | 25.0 | 55.9 |
| 7 | — | — | — | ED | 45.0 | 57.7 | TPA | 55.0 | 42.3 |

The abbreviations in Tables 4 to 5 are as follows.

PO2: bisphenol A/PO adduct (average number of added moles 2.0)

ED: ethylene diol (ethylene glycol)

TPA: terephthalic acid

TABLE 5

| Amorphous polyester | Polymerizable monomer | | Polymerizable monomer | | Polymerizable monomer | | |
|---|---|---|---|---|---|---|---|
| A No. | Unit | $SP_{A1}$ | Unit | $SP_{A2}$ | Unit | $SP_{A3}$ | $SP_A$ |
| 1 | PO2 | 9.92 | ED | 11.52 | TPA | 11.87 | 11.0 |
| 2 | PO2 | 9.92 | ED | 11.52 | TPA | 11.87 | 10.6 |
| 3 | PO2 | 9.92 | ED | 11.52 | TPA | 11.87 | 10.5 |
| 4 | PO2 | 9.92 | ED | 11.52 | TPA | 11.87 | 11.3 |
| 5 | PO2 | 9.92 | ED | 11.52 | TPA | 11.87 | 11.4 |
| 6 | PO2 | 9.92 | — | 11.52 | TPA | 11.87 | 10.4 |
| 7 | — | — | ED | 11.52 | TPA | 11.87 | 11.7 |

In the table, the units of $SP_A$ are $(cal/cm^3)^{0.5}$.

Production Example of Toner 1

Amorphous polyester A1: 90 parts

Crystalline polyester C1: 10 parts

Fischer-Tropsch wax (peak temperature of 76° C. of maximum endothermic peak): 5 parts Carbon black: 10 parts The above materials were mixed using a Henschel mixer (FM-75 model, by Mitsui Kozan KK) at a rotational speed of 1500 rpm and for a rotation time of 5 min, followed by kneading using a twin-screw kneader (PCM-30 model, by Ikegai Corp.) set to a temperature of 130° C. The obtained kneaded product was cooled and was coarsely pulverized with a hammer mill, to a size of 1 mm or less, to yield a coarsely pulverized product. The obtained coarsely pulverized product was then finely pulverized using a mechanical pulverizer (T-250, by Turbo Kogyo Co., Ltd.). The resulting product was classified using Faculty (F-300, by Hosokawa Micron Corporation), to yield Toner particle 1. The operating conditions were set to a rotational speed of 11000 rpm of a classification rotor, and a rotational speed of 7200 rpm of a distribution rotor.

Toner particle 1: 100 parts

Silica fine particles A: fumed silica surface-treated with hexamethyldisilazane (number-basis median diameter (D50) of 120 nm)): 4 parts Small-diameter inorganic fine particles: titanium oxide fine particles surface-treated with isobutyltrimethoxysilane (number-basis median diameter (D50) of 10 nm)): 1 part The above materials were mixed using a Henschel mixer (FM-75 model, by Mitsui Miike Chemical Engineering Machinery Co., Ltd.) at a rotational speed of 1900 rpm and for a rotation time of 10 min, to yield Toner 1 exhibiting negative charging performance. Toner 1 had $SP_A-SP_C$ of 1.9, $SP_C-SP_W$ of 1.1, ΔH of 10.0 J/g and $T_C-T_W$ of 4.0° C.

Production Examples of Toners 2 to 34

In the production example of Toner 1, Toners 2 to 34 were obtained by performing an operation similar to that of the production example of Toner 1, but herein the type and addition amount of the Amorphous polyester A, the type and addition amount of the Crystalline polyester C, and the type of the wax were modified as given in Table 6. The obtained physical properties are given in Table 6.

TABLE 6

| Toner | Formulation: Amorphous polyester A | | Formulation: Crystalline polyester C | | Formulation: Wax W | | | Properties | | | |
|---|---|---|---|---|---|---|---|---|---|---|---|
| No. | Type | Parts | Type | Parts | Type | $SP_W$ | Melting point | $SP_A - SP_C$ | $SP_C - SP_W$ | ΔH J/g | $T_C - T_W$ ° C. |
| 1 | 1 | 90.0 | 1 | 10.0 | W1 | 8.1 | 76 | 1.9 | 1.1 | 10.0 | 4.0 |
| 2 | 1 | 90.0 | 1 | 10.0 | W2 | 8.4 | 100 | 1.9 | 0.8 | 10.0 | 28.0 |
| 3 | 1 | 90.0 | 1 | 10.0 | W3 | 8.6 | 77 | 1.9 | 0.6 | 10.0 | 5.0 |
| 4 | 1 | 90.0 | 1 | 10.0 | W4 | 7.9 | 70 | 1.9 | 1.3 | 10.0 | 2.0 |
| 5 | 1 | 90.0 | 2 | 10.0 | W1 | 8.1 | 76 | 1.8 | 1.1 | 10.0 | 4.0 |
| 6 | 1 | 90.0 | 3 | 10.0 | W1 | 8.1 | 76 | 1.8 | 1.1 | 10.0 | 4.0 |
| 7 | 1 | 95.0 | 1 | 5.0 | W1 | 8.1 | 76 | 1.9 | 1.1 | 5.0 | 4.0 |
| 8 | 1 | 95.2 | 1 | 4.8 | W1 | 8.1 | 76 | 1.9 | 1.1 | 4.5 | 4.0 |
| 9 | 1 | 85.5 | 1 | 14.5 | W1 | 8.1 | 76 | 1.9 | 1.1 | 15.0 | 4.0 |
| 10 | 1 | 85.0 | 1 | 15.0 | W1 | 8.1 | 76 | 1.9 | 1.1 | 15.5 | 4.0 |
| 11 | 2 | 90.0 | 1 | 10.0 | W1 | 8.1 | 76 | 1.6 | 1.1 | 10.0 | 4.0 |
| 12 | 3 | 90.0 | 1 | 10.0 | W1 | 8.1 | 76 | 1.4 | 1.1 | 10.0 | 4.0 |
| 13 | 4 | 90.0 | 1 | 10.0 | W1 | 8.1 | 76 | 2.2 | 1.1 | 10.0 | 4.0 |
| 14 | 5 | 90.0 | 1 | 10.0 | W1 | 8.1 | 76 | 2.3 | 1.1 | 10.0 | 4.0 |
| 15 | 6 | 90.0 | 1 | 10.0 | W1 | 8.1 | 76 | 1.3 | 1.1 | 10.0 | 4.0 |
| 16 | 7 | 90.0 | 1 | 10.0 | W1 | 8.1 | 76 | 2.6 | 1.1 | 10.0 | 4.0 |
| 17 | 2 | 90.0 | 4 | 10.0 | W1 | 8.1 | 76 | 1.8 | 1.1 | 10.0 | 4.0 |
| 18 | 2 | 90.0 | 5 | 10.0 | W1 | 8.1 | 76 | 1.8 | 1.1 | 10.0 | 4.0 |
| 19 | 4 | 90.0 | 6 | 10.0 | W1 | 8.1 | 76 | 1.9 | 1.1 | 10.0 | 4.0 |
| 20 | 4 | 90.0 | 7 | 10.0 | W1 | 8.1 | 76 | 1.8 | 1.1 | 10.0 | 4.0 |
| 21 | 1 | 90.0 | 8 | 10.0 | W1 | 8.1 | 76 | 1.9 | 1.1 | 10.0 | 4.0 |
| 22 | 1 | 90.0 | 9 | 10.0 | W1 | 8.1 | 76 | 1.8 | 1.1 | 10.0 | 4.0 |
| 23 | 1 | 90.0 | 10 | 10.0 | W1 | 8.1 | 76 | 1.8 | 1.1 | 10.0 | 4.0 |
| 24 | 1 | 90.0 | 11 | 10.0 | W1 | 8.1 | 76 | 1.8 | 1.1 | 10.0 | 4.0 |
| 25 | 1 | 90.0 | 12 | 10.0 | W1 | 8.1 | 76 | 1.9 | 1.1 | 10.0 | 4.0 |
| 26 | 1 | 90.0 | 13 | 10.0 | W1 | 8.1 | 76 | 1.9 | 1.1 | 10.0 | 4.0 |
| 27 | 1 | 90.0 | 14 | 10.0 | W1 | 8.1 | 76 | 1.9 | 1.1 | 10.0 | 4.0 |
| 28 | 1 | 90.0 | 15 | 10.0 | W1 | 8.1 | 76 | 1.9 | 1.1 | 10.0 | 4.0 |
| 29 | 1 | 90.0 | 16 | 10.0 | W1 | 8.1 | 76 | 1.9 | 1.1 | 10.0 | 4.0 |

TABLE 6-continued

| Toner No. | Amorphous polyester A Type | Amorphous polyester A Parts | Crystalline polyester C Type | Crystalline polyester C Parts | Wax W Type | Wax W $SP_W$ | Wax W Melting point | $SP_A - SP_C$ | $SP_C - SP_W$ | ΔH J/g | $T_C - T_W$ ° C. |
|---|---|---|---|---|---|---|---|---|---|---|---|
| 30 | 1 | 90.0 | 17 | 10.0 | W1 | 8.1 | 76 | 1.8 | 1.1 | 10.0 | 4.0 |
| 31 | 1 | 90.0 | 18 | 10.0 | W1 | 8.1 | 76 | 1.8 | 1.1 | 10.0 | 4.0 |
| 32 | 1 | 90.0 | 19 | 10.0 | W1 | 8.1 | 76 | 1.9 | 1.1 | 10.0 | 4.0 |
| 33 | 1 | 90.0 | 20 | 10.0 | W1 | 8.1 | 76 | 1.9 | 1.1 | 10.0 | 4.0 |
| 34 | 1 | 90.0 | 21 | 10.0 | W1 | 8.1 | 76 | 1.9 | 1.1 | 10.0 | 4.0 |

(Formulation: Amorphous polyester A, Crystalline polyester C, Wax W; Properties: $SP_A - SP_C$, $SP_C - SP_W$, ΔH, $T_C - T_W$)

The abbreviations in Table 6 are as follows.

W1: Fischer-Tropsch wax (peak temperature of 76° C. of maximum endothermic peak)

W2: Fischer-Tropsch wax (peak temperature of 100° C. of maximum endothermic peak)

W3: behenyl behenate wax (peak temperature of 77° C. of maximum endothermic peak)

W4: paraffin wax (peak temperature of 70° C. of maximum endothermic peak)

Production Example of Magnetic Carrier 1

Magnetite 1 (intensity of magnetization 65 $Am^2/kg$ in a 1000/47c (kA/m) magnetic field) having a number-average particle diameter of 0.30 m Magnetite 2 (intensity of magnetization 65 $Am^2/kg$ in a 1000/47c (kA/m) magnetic field) having a number-average particle diameter of 0.50 m Herein 4.0 parts of a silane compound (3-(2-aminoethylaminopropyl)trimethoxysilane) were added relative to 100 parts of each of the above materials, with high-speed mixing and stirring at 100° C. or above, inside the vessel, to treat the respective fine particles.

Phenol: 10 mass %

Formaldehyde solution: 6 mass %

(Formaldehyde 40 Mass %, Methanol 10 Mass %, Water 50 Mass %)

Magnetite 1 treated with the above silane compound: 58 mass %

Magnetite 2 treated with the above silane compound: 26 mass %

Then 100 parts of the above material, 5 parts of a 28 mass % aqueous ammonia solution, and 20 parts of water were charged into a flask, the temperature was raised to 85° C. over 30 minutes while under mixing by stirring, and a polymerization reaction was conducted by holding that temperature for 3 hours, to cure the generated phenolic resin. The cured phenolic resin was then cooled down to 30° C., followed by further addition of water, after which the supernatant was removed, and the precipitate was washed with water and was subsequently air-dried. Next, the resulting product was dried under reduced pressure (5 mmHg or lower) at a temperature of 60° C., to yield a spherical Magnetic carrier 1 of magnetic body-dispersed type. The volume-basis 50% particle diameter (D50) of Magnetic carrier 1 was 34.21 μm.

Production Example of Two-Component Developer 1

Herein 92.0 parts of Magnetic carrier 1 and 8.0 parts of Toner 1 were mixed using a V-type mixer (V-20, by Seishin Enterprise Co., Ltd.), to obtain Two-component developer 1.

Production Examples of Two-Component Developers 2 to 34

Two-component developers 2 to 34 were produced by performing the same operation as in the production example of Two-component developer 1, except for the modifications given in Table 7.

TABLE 7

| | Two-component developer | Toner | Magnetic carrier |
|---|---|---|---|
| Example 1 | 1 | 1 | 1 |
| Example 2 | 2 | 2 | 1 |
| Example 3 | 3 | 3 | 1 |
| Example 4 | 4 | 4 | 1 |
| Example 5 | 5 | 5 | 1 |
| Example 6 | 6 | 6 | 1 |
| Example 7 | 7 | 7 | 1 |
| Example 8 | 8 | 8 | 1 |
| Example 9 | 9 | 9 | 1 |
| Example 10 | 10 | 10 | 1 |
| Example 11 | 11 | 11 | 1 |
| Example 12 | 12 | 12 | 1 |
| Example 13 | 13 | 13 | 1 |
| Example 14 | 14 | 14 | 1 |
| Example 15 | 15 | 15 | 1 |
| Example 16 | 16 | 16 | 1 |
| Example 17 | 17 | 17 | 1 |
| Example 18 | 18 | 18 | 1 |
| Example 19 | 19 | 19 | 1 |
| Example 20 | 20 | 20 | 1 |
| Example 21 | 21 | 21 | 1 |
| Example 22 | 28 | 28 | 1 |
| Example 23 | 22 | 22 | 1 |
| Example 24 | 29 | 29 | 1 |
| Example 25 | 23 | 23 | 1 |
| Example 26 | 24 | 24 | 1 |
| Example 27 | 25 | 25 | 1 |
| Example 28 | 26 | 26 | 1 |
| Example 29 | 27 | 27 | 1 |
| Comparative example 1 | 30 | 30 | 1 |
| Comparative example 2 | 31 | 31 | 1 |
| Comparative example 3 | 32 | 32 | 1 |
| Comparative example 4 | 33 | 33 | 1 |
| Comparative example 5 | 34 | 34 | 1 |

Example 1

Evaluations were performed using the above Two-component developer 1. Two-component developer 1 was introduced into a cyan developing device, using an image forming apparatus in the form of a modified printer imageRUNNER ADVANCE C5560 for digital commercial printing, by Canon Inc. The apparatus was modified so as to allow freely setting the fixation temperature, process speed, the DC voltage $V_{DC}$ of a developer carrier member, the charging voltage $V_D$ of an electrostatic latent image bearing member, and laser power. To evaluate image output, an FFh image (solid image) having a desired image ratio was outputted, and $V_DC$, $V_D$ and laser power were adjusted so that the toner laid-on level on the FFh image, on paper, took on a desired value; the below-described evaluation was then carried out. Herein "FFh" denotes a value obtained by displaying 256 gradations in hexadecimal notation, with 00 h as the first of the 256 gradations (white background portion) and FFh as the 256-th of the 256 gradations (solid portion). The evaluation is based on the following evaluation methods; the results are given in Table 10.

Abrasion Resistance

Paper: Image coat gloss 158 (158.0 g/m$^2$)

(sold by Canon Marketing Japan Inc.)

Laid-on level of toner on paper: 0.05 mg/cm$^2$ (2Fh image)

(adjusted on the basis of the DC voltage $V_{DC}$ of the developer carrying member, the charging voltage $V_D$ of the electrostatic latent image bearing member, and laser power)

Evaluation image: 3 cm×15 cm image in the center of the above A4 paper

Fixation test environment: normal-temperature/normal humidity environment (temperature 23° C./humidity 50% RH (hereafter N/N))

Fixation temperature: 180° C.

Process speed: 377 mm/sec

The above evaluation image was outputted and abrasion resistance was evaluated. The value of a difference in reflectance was taken as an evaluation index of abrasion resistance. Firstly, a color fastness rubbing tester (AB-301: by Tester Sangyo Co., Ltd.) is used to apply a load of 0.5 kgf to an image portion of the evaluation image, with rubbing (10 back-and-forth rubs) using a new evaluation paper. Thereafter the reflectance of the rubbed portion and the reflectance of the non-rubbed portion of the new evaluation paper are measured using a reflectometer (REFLECTOMETER MODEL TC-6DS: by Tokyo Denshoku Co., Ltd.).

The difference in reflectance before and after rubbing was calculated on the basis of the expression below. The difference in the obtained reflectance was evaluated according to the evaluation criteria below. Ratings from A to C in the evaluation were deemed as good.

Reflectance difference=reflectance before rubbing−reflectance after rubbing

Evaluation Criteria

A: less than 1.0%

B: from 1.0% to less than 2.0%

C: from 2.0% to less than 4.0%

D: 4.0% or more

Low-Temperature Fixing Performance

Paper: GFC-081 (81.0 g/m$^2$) (sold by Canon Marketing Japan Inc.)

Laid-on level of toner on paper: 0.50 mg/cm$^2$ (adjusted on the basis of the DC voltage $V_{DC}$ of the developer carrying member, the charging voltage $V_D$ of the electrostatic latent image bearing member, and laser power)

Evaluation image: 2 cm×5 cm in the center of the above A4 paper

Test environment: low-temperature, low-humidity environment: temperature 15° C./humidity 10% RH (hereafter "L/L")

Fixation temperature: 150° C.

Process speed: 377 mm/sec

The above evaluation image was outputted and low-temperature fixing performance was evaluated. The value of the rate of decrease of image density was taken as an evaluation index of low-temperature fixing performance. To evaluate the rate of decrease in image density, image density at the center is measured firstly using an X-Rite color reflection densitometer (500 series: by X-Rite Inc.). Next, a load of 4.9 kPa (50 g/cm$^2$) is applied to the portion where the image density is measured, and the fixed image is rubbed (5 back-and-forth rubs) with lens-cleaning paper, whereupon image density is measured again.

The rate of decrease of image density before and after rubbing was calculated on the basis of the expression below. The obtained rate of decrease of the image density was evaluated in accordance with the evaluation criteria below. Ratings from A to C in the evaluation were deemed as good.

Rate of decrease of image density=(image density before rubbing−image density after rubbing)/image density before rubbing×100

Evaluation Criteria

A: rate of decrease of image density lower than 3%

B: rate of decrease of image density from 3% to less than 5%

C: rate of decrease of image density from 5% to less than 8%

D: rate of decrease of image density of 8% or higher

Charge Retention Rate in a High-Temperature, High-Humidity Environment

Paper: GFC-081 (81.0 g/m$^2$) (by Canon Marketing Japan Inc.)

laid-on level on paper: 0.35 mg/cm$^2$ (adjusted the basis of the DC voltage $V_{DC}$ of the developer carrier member, the charging voltage $V_D$ of the electrostatic latent image bearing member, and laser power)

Evaluation image: 2 cm×5 cm image disposed at the center of the A4 paper

Fixation test environment: high-temperature, high-humidity environment: temperature 30° C./humidity 80% RH (hereafter "H/H")

Process speed: 377 mm/sec

The triboelectric charge quantity of the toner was calculated by suction-collecting the toner on the electrostatic latent image bearing member using a metallic cylindrical tube and a cylindrical filter. Specifically, the triboelectric charge quantity of the toner on the electrostatic latent image bearing member was measured using a Faraday cage. The Faraday cage herein is a coaxial double cylinder such that the inner cylinder and outer cylinder are insulated from each other. When a charged body having a charge amount of Q is placed in the inner cylinder a state is brought about, on account of electrostatic induction, that is identical to that as if a metal cylinder having a charge amount Q were present. This induced charge amount was measured using an electrometer (Keithley 6517A, by Keithley Instruments Inc.), and the quotient (Q/M) resulting from dividing the charge amount Q (mC) by the toner mass M (kg) in the inner cylinder was taken as the triboelectric charge quantity of the toner.

Triboelectric charge quantity of toner (mC/kg)=*Q/M*

Firstly, the above evaluation image was formed on the electrostatic latent image bearing member, the rotation of the electrostatic latent image bearing member was stopped prior to transfer of the evaluation image to the intermediate transfer member, and the toner on the electrostatic latent image bearing member was suctioned and collected by a metallic cylindrical tube and cylindrical filter, whereupon Evaluation Criteria A: retention rate 95% or higher B: retention rate from 90% to less than 95%

C: retention rate from 85% to less than 90%

D: retention rate lower than 85%

Examples 2 to 25 and Comparative Examples 1 to 5

Evaluations were carried out in the same way as in Example 1, but using herein Two-component developers 2 to 34. Evaluation results are given in Table 8.

TABLE 8

| | Low-temperature fixing performance | | | | Abrasion resistance | | Charge retention | | | |
|---|---|---|---|---|---|---|---|---|---|---|
| Example No. | | Image density before rubbing | Image density after rubbing | Rate of decrease | | Reflectance difference | | Q/M before standing | Q/M after standing | Retention rate |
| 1 | A | 1.35 | 1.32 | 2% | A | 0.0% | A | 36 | 36 | 100% |
| 2 | A | 1.35 | 1.32 | 2% | C | 3.0% | A | 36 | 36 | 100% |
| 3 | A | 1.35 | 1.32 | 2% | B | 1.5% | A | 36 | 36 | 100% |
| 4 | A | 1.35 | 1.32 | 2% | B | 1.5% | A | 36 | 36 | 100% |
| 5 | A | 1.35 | 1.32 | 2% | B | 1.8% | B | 36 | 33 | 92% |
| 6 | A | 1.35 | 1.32 | 2% | C | 2.5% | C | 36 | 32 | 89% |
| 7 | A | 1.35 | 1.32 | 2% | B | 1.8% | A | 36 | 36 | 100% |
| 8 | A | 1.35 | 1.32 | 2% | C | 2.5% | A | 36 | 36 | 100% |
| 9 | A | 1.35 | 1.32 | 2% | A | 0.0% | B | 36 | 33 | 92% |
| 10 | A | 1.35 | 1.32 | 2% | A | 0.0% | C | 36 | 32 | 89% |
| 11 | A | 1.35 | 1.32 | 2% | B | 1.8% | B | 36 | 33 | 92% |
| 12 | A | 1.35 | 1.32 | 2% | C | 2.5% | C | 36 | 32 | 89% |
| 13 | B | 1.35 | 1.31 | 3% | A | 0.0% | A | 36 | 36 | 100% |
| 14 | C | 1.35 | 1.28 | 5% | A | 0.0% | A | 36 | 36 | 100% |
| 15 | A | 1.35 | 1.32 | 2% | C | 3.5% | C | 36 | 31 | 86% |
| 16 | C | 1.35 | 1.26 | 7% | A | 0.0% | A | 36 | 36 | 100% |
| 17 | A | 1.35 | 1.32 | 2% | B | 1.8% | A | 36 | 36 | 100% |
| 18 | A | 1.35 | 1.32 | 2% | C | 2.5% | A | 36 | 36 | 100% |
| 19 | A | 1.35 | 1.32 | 2% | B | 1.8% | B | 36 | 33 | 92% |
| 20 | A | 1.35 | 1.32 | 2% | C | 2.5% | C | 36 | 32 | 89% |
| 21 | A | 1.35 | 1.32 | 2% | B | 1.8% | B | 36 | 33 | 92% |
| 22 | A | 1.35 | 1.32 | 2% | C | 2.5% | C | 36 | 32 | 89% |
| 23 | A | 1.35 | 1.32 | 2% | B | 1.8% | B | 36 | 33 | 92% |
| 24 | A | 1.35 | 1.32 | 2% | C | 2.5% | C | 36 | 32 | 89% |
| 25 | A | 1.35 | 1.32 | 2% | C | 2.5% | C | 36 | 32 | 89% |
| 26 | A | 1.35 | 1.32 | 2% | C | 2.5% | C | 36 | 32 | 89% |
| 27 | A | 1.35 | 1.32 | 2% | C | 2.5% | C | 36 | 32 | 89% |
| 28 | A | 1.35 | 1.32 | 2% | C | 2.5% | C | 36 | 32 | 89% |
| 29 | A | 1.35 | 1.32 | 2% | C | 2.5% | C | 36 | 32 | 89% |
| C.E. 1 | A | 1.35 | 1.32 | 2% | D | 4.0% | D | 36 | 30 | 83% |
| C.E. 2 | A | 1.35 | 1.32 | 2% | D | 4.0% | D | 36 | 30 | 83% |
| C.E. 3 | A | 1.35 | 1.32 | 2% | D | 4.0% | D | 36 | 30 | 83% |
| C.E. 4 | A | 1.35 | 1.32 | 2% | D | 4.0% | D | 36 | 30 | 83% |
| C.E. 5 | A | 1.35 | 1.32 | 2% | D | 4.0% | D | 36 | 30 | 83% |

"initial Q/M" was measured. Subsequently, the developing device was placed in an evaluation apparatus, in an "H/H" environment, and was allowed to stand, as it was, for 2 weeks; thereafter, there was carried out the same operation as that prior to standing, and the charge amount Q/M (mC/kg) per unit mass of the electrostatic latent image bearing member after standing was measured. Then a retention rate of Q/M per unit mass on the electrostatic latent image bearing member after standing ("Q/M after standing"/"initial Q/M"×100) was calculated relative to 100% as the initial Q/M per unit mass of the electrostatic latent image bearing member, and the calculated retention rate was evaluated in accordance with the criteria below. Ratings from A to C in the evaluation were deemed as good.

In the Table, "C.E." indicates "Comparative example".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-081004, filed May 12, 2021, which is hereby incorporated by reference herein in its entirety.

What is claimed is:

1. A toner, comprising:

a toner particle comprising a binder resin;

the binder resin comprising an amorphous polyester and a crystalline polyester;

a weight-average molecular weight of a soluble matter of the crystalline polyester in o-dichlorobenzene at 100° C. being 1800 to 2500;

a main chain of the crystalline polyester being a condensation polymer of an aliphatic dicarboxylic acid and an aliphatic diol, and a difference between the number of carbon of the aliphatic carboxylic acid and the number of carbon of the aliphatic diol being 2 or less; and the crystalline polyester comprising a modified crystalline polyester having at least one terminal-modified structure in which (i) a hydroxy group at a main chain terminal is terminal-modified with a C16 to C31 aliphatic monocarboxylic acid, or (ii) a carboxy group at a main chain terminal of the crystalline polyester is terminal-modified with a C15 to C30 aliphatic monoalcohol, wherein a content ratio of the terminal-modified structure in the crystalline polyester is 90.0 mol % or higher, a content ratio of the crystalline polyester in the binder resin is 3.0 to 12.0 mass %, a total of the acid value and the hydroxyl value of the crystalline polyester is 0.1 to 3.0 mgKOH/g, and $1.8 \le SP_A - SP_C \le 2.1$ when $SP_C$ is an SP value of the crystalline polyester, and $SP_A$ is an SP value of the amorphous polyester.

2. The toner according to claim 1, wherein a total content ratio in the crystalline polyester of a monomer unit of the aliphatic monocarboxylic acid and a monomer unit of the aliphatic monoalcohol included in the terminal-modified structure is 30.0 mass % or higher.

3. The toner according to claim 1, wherein $SP_C$ is 8.8 to 9.4 $(cal/cm^3)^{0.5}$.

4. The toner according to claim 1, wherein $SP_A$ is 10.5 to 11.5 $(cal/cm^3)^{0.5}$.

5. The toner according to claim 1, wherein an endothermic quantity ΔH of the toner derived from the crystalline polyester is 5.0 to 15.0 J/g measured by differential scanning calorimetric measurement.

6. The toner according to claim 1, wherein the toner particle comprises a hydrocarbon wax, and $0.7 \le SP_C - SP_W \le 1.2$ when $SP_W$ is an SP value of the hydrocarbon wax.

7. The toner according to claim 6, wherein $0.0 \le |T_C - T_W| 25.0$ when $T_W$ is the melting point of the hydrocarbon wax, and $T_C$ is the melting point of the crystalline polyester.

8. The toner according to claim 1, wherein the amorphous polyester comprises monomer units represented by Formulae (F) and (G)

(F)

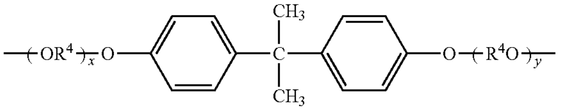

(G)

$$-(O-R^5-O)-$$

where $R^4$ independently represents an ethylene group or a propylene group, x and y are independently an integer of at least 1 with the proviso that the average value of x+y is 2 to 10, and $R^5$ represents an ethylene group or a propylene group.

9. The toner according to claim 1, wherein the content ratio of the terminal-modified structure in the crystalline polyester is at least 95.0 mol %.

* * * * *